(12) United States Patent
Murata et al.

(10) Patent No.: US 10,469,793 B2
(45) Date of Patent: Nov. 5, 2019

(54) IMAGE PROCESSING DEVICE

(71) Applicant: NORITSU PRECISION CO., LTD., Wakayama-shi, Wakayama (JP)

(72) Inventors: Yukiko Murata, Wakayama (JP); Tomoo Nakano, Wakayama (JP)

(73) Assignee: NORITSU PRECISION CO., LTD., Wakayama-shi (JP)

(*) Notice: Subject to any disclaimer, the term of this patent is extended or adjusted under 35 U.S.C. 154(b) by 388 days.

(21) Appl. No.: 15/129,301

(22) PCT Filed: Jan. 20, 2015

(86) PCT No.: PCT/JP2015/051363
§ 371 (c)(1),
(2) Date: Apr. 18, 2017

(87) PCT Pub. No.: WO2015/146241
PCT Pub. Date: Oct. 1, 2015

(65) Prior Publication Data
US 2017/0257596 A1    Sep. 7, 2017

(30) Foreign Application Priority Data
Mar. 27, 2014  (JP) ................. 2014-066865

(51) Int. Cl.
*G06K 9/00* (2006.01)
*H04N 5/915* (2006.01)
(Continued)

(52) U.S. Cl.
CPC ......... *H04N 5/915* (2013.01); *G06K 9/00751* (2013.01); *G06K 9/00758* (2013.01);
(Continued)

(58) Field of Classification Search
CPC .......... H04N 5/915; H04N 5/93; H04N 7/183; G06K 9/00751; G06K 9/00758; G06K 9/00771; G06K 9/6215; G11B 27/00
(Continued)

(56) References Cited

U.S. PATENT DOCUMENTS 6,278,446 B1    8/2001 Liou et al.
7,016,540 B1*   3/2006 Gong ............... G06F 17/30802
                                                    348/700
(Continued)

FOREIGN PATENT DOCUMENTS

| CN | 102378004 A | 3/2012 |
|---|---|---|
| CN | 102378005 A | 3/2012 |

(Continued)

OTHER PUBLICATIONS

Schoeffmann, Klaus, Mario Taschwer, and Laszlo Boeszoermenyi. "The video explorer: a tool for navigation and searching within a single video based on fast content analysis." Proceedings of the first annual ACM SIGMM conference on Multimedia systems. ACM, 2010. (year: 2010).*

(Continued)

*Primary Examiner* — Jonathan S Lee
(74) *Attorney, Agent, or Firm* — Westerman, Hattori, Daniels & Adrian, LLP

(57) ABSTRACT

Provided is an image processing device for sorting frames included in one moving image into different channels, the frames included in the moving image being a mixture of frames belonging to the different channels. The image processing device includes an automatic sorting unit. The automatic sorting unit calculates a similarity degree of the plurality of frames included in the moving image by per- (Continued)

forming image processing on the frames, and sorts the plurality of frames into the plurality of channels based on the similarity degree.

17 Claims, 18 Drawing Sheets

(51) Int. Cl.
| | |
|---|---|
| *H04N 5/93* | (2006.01) |
| *G06K 9/62* | (2006.01) |
| *H04N 7/18* | (2006.01) |
| *G11B 27/28* | (2006.01) |
| *G11B 27/30* | (2006.01) |

(52) U.S. Cl.
CPC ....... *G06K 9/00771* (2013.01); *G06K 9/6215* (2013.01); *G11B 27/28* (2013.01); *G11B 27/3081* (2013.01); *H04N 5/93* (2013.01); *H04N 7/183* (2013.01)

(58) Field of Classification Search
USPC .......................................................... 382/103
See application file for complete search history.

(56) References Cited

U.S. PATENT DOCUMENTS

| | | | | |
|---|---|---|---|---|
| 7,379,627 | B2* | 5/2008 | Li | G06K 9/4652 |
| | | | | 382/305 |
| 8,200,648 | B2* | 6/2012 | Boiman | G06K 9/4671 |
| | | | | 707/706 |
| 10,169,682 | B2* | 1/2019 | Nakagawa | G11B 27/00 |
| 2003/0023910 | A1* | 1/2003 | Myler | H04N 17/004 |
| | | | | 714/704 |
| 2009/0067807 | A1 | 3/2009 | Hirohata et al. | |
| 2011/0044549 | A1 | 2/2011 | Bressan | |
| 2012/0039538 | A1 | 2/2012 | Takagi | |
| 2012/0039581 | A1 | 2/2012 | Takagi | |
| 2013/0097625 | A1 | 4/2013 | Thorwirth et al. | |
| 2016/0219326 | A1 | 7/2016 | Borsum et al. | |
| 2017/0140251 | A1* | 5/2017 | Nakagawa | G11B 27/00 |

FOREIGN PATENT DOCUMENTS

| | | |
|---|---|---|
| CN | 103440640 A | 12/2013 |
| EP | 0938054 A2 | 8/1999 |
| EP | 2299371 A1 | 3/2011 |
| JP | 2001-36867 A | 2/2001 |
| JP | 2002-288663 A | 10/2002 |
| JP | 2002-319210 A | 10/2002 |
| JP | 2004-254244 A | 9/2004 |
| JP | 2008-141749 A | 6/2008 |
| JP | 2012-221061 A | 11/2012 |
| JP | 2013-157874 A | 8/2013 |
| JP | 2013-239205 A | 11/2013 |
| WO | 2007/072347 A2 | 6/2007 |
| WO | 2015/032605 A1 | 3/2015 |

OTHER PUBLICATIONS

International Search Report dated Mar. 10, 2015, issued in counterpart International Application No. PCT/JP2015/051363 (2 pages).
Azuma et al., "Image Quality Assessment Method for Various-Sized Images Based on SSIM", IEICE Technical Report, (2011), vol. 1111, Cited in ISR. (6 pages).
Office Action dated Nov. 13, 2018, issued in counterpart Japanese application No. 2006-510075, with English translation. (9 pages).
Extended European Search Report dated Oct. 7, 2017, issued in European Patent Application No. 15769409.2 (PCT/JP2015051363).
Office Action dated Dec. 5, 2018, issued in counterpart Chinese Application No. 201580007339.7, with English translation (16 pages).

* cited by examiner

FIG. 15
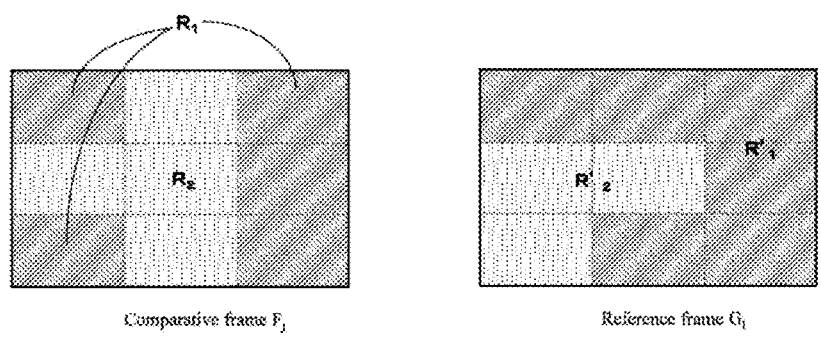
Comparative frame $F_j$  Reference frame $G_l$
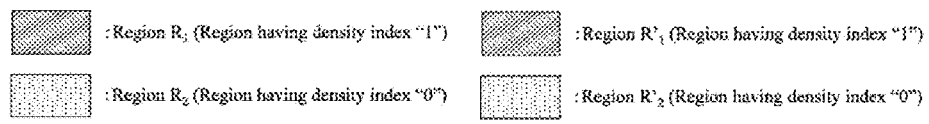

FIG. 18

Weight (natural): green 0.5, brown 0.25, beige 0.25

IMAGE PROCESSING DEVICE

TECHNICAL FIELD

The present invention relates to an image processing device and an image processing program, and particularly relates to an image processing device and image processing program that are configured to sort frames included in one moving image into different channels, the frames included in the moving image being a mixture of frames that belong to the different channels.

BACKGROUND ART

An intermittent recording method, called "time-lapse", is known as a moving image recording method. This is a method for recording an image at a lower frame rate than usual, that is, in a time-lapse manner, and enables recording for a longer time period than usual to the same recording medium. Security cameras often employ the time-lapse method, and furthermore a video picture from another security camera may be inserted into a time period gap that is generated by lowering the frame rate. In this case, a moving image in which video pictures from a plurality of cameras, that is, video pictures of a plurality of channels are switched alternately along one time-line, is recorded.

With respect to the moving image in which video pictures of a plurality of channels are recorded together on one time-line, video pictures from each camera, that is, each channel, can be displayed on a monitor with dedicated equipment. In the dedicated equipment of Patent Literature 1, channel number data is added to the frames of video pictures of a plurality of channels, and at the time of reproduction, the dedicated equipment can select only the video pictures of a desired channel from among the video pictures of the plurality of channels by referencing the channel number data.

CITATION LIST

Patent literature

Patent Literature 1: IP 2002-319210A

SUMMARY OF INVENTION

Technical Problem

However, when reproducing video pictures in which video pictures of multiple channels are mixed with each other, using general-purpose reproduction equipment, it is impossible to view video pictures for each channel. The specifications for recognizing the channel of each frame differs between manufacturers or device types, and thus general-purpose reproduction equipment cannot support these specifications.

It is an object of the present invention to provide an image processing device and an image processing program that enable, when one moving image includes a mixture of frames that belong to different channels, reproduction for each channel regardless of specifications by which the moving image is recorded.

Solution to Problem

According to a first aspect of the present invention, an image processing device is configured to sort frames included in one moving image into different channels, the frames included in the moving image being a mixture of frames belonging to the different channels and includes an automatic sorting unit. The automatic sorting unit calculates a similarity degree of the plurality of frames included in the moving image by performing image processing on the frames, and sorts the plurality of frames into the plurality of channels based on the similarity degree.

Here is provided a function for sorting, when one moving image includes a mixture of frames belonging to different channels, these frames by the channels. Specifically, first a degree of similarity (similarity degree) between the plurality of frames included in the moving image is calculated by performing image processing on the frames, and the plurality of frames are automatically sorted into the plurality of channels based on the similarity degrees. According to this function, regardless of the specifications of the moving image, it is possible to separate the moving image that includes a mixture of frames belonging to different channels into moving images for fee respective channels. That, is, when one moving image- includes a mixture of frames belonging to different channels, it is possible to perform reproduction for each channel, regardless of under which specifications the moving image is recorded.

According to a second aspect of the present invention, the image processing device according to the first aspect is such that the automatic sorting unit includes a setting unit, a calculation unit, and a determination unit. The setting unit sets a specific frame included in the moving image or a frame that is obtained by combining two or more specific frames included in the moving image as a reference frame, and sets another specific frame included in the moving image as a comparative frame. The calculation unit executes calculation processing. The calculation processing is processing of dividing the comparative frame and the reference frame into a plurality of sub-regions, calculating a local similarity degree between the comparative frame and the reference frame for each sub-region, and calculating a total similarity degree only using sub-regions having a high local similarity degree. The total similarity degree is a frame-overall similarity degree between the comparative frame and the reference frame. The determination unit executes determination processing of determining, based on the total similarity degree, whether or not the comparative frame belongs to the same channel as that of the reference frame or the frames combined into the reference frame.

Note that "dividing a frame into a plurality of sub-regions" includes, in addition to thoroughly dividing an entire frame into a plurality of sub-regions without the sub-regions overlapping each other, thoroughly dividing a partial region of an entire frame (for example, the central region excluding an outer region, or the like) into a plurality of sub-regions without the sub-regions overlapping each other, dividing the entirety or a part of a frame into a plurality of sub-regions with some sub-regions overlapping each other, and the like.

Here, in order to calculate the degree of similarity between the frames included in the moving image, the comparative frame and the reference frame are divided into sub-regions, and local degrees of similarity between the comparative frame and the reference frame are calculated on a sub-region basis. Then, a total similarity degree for the entire frame is calculated only using sub-regions having a high local similarity degree. This total similarity degree is used as a criteria for determining whether or not the comparative frame and the reference frame belong to the same channel.

That is, here, information relating to the sub-regions having a low local similarity degree is not taken into consideration for the calculation of the total similarity degree. This is because frames belonging to the same channel have the same background image except for a part in which a moving subject is present (hereinafter, referred to as "moving subject part"). Also, if the moving subject part accounts for a large ratio in the entire frame, and the total similarity degree between frames is determined using information relating to the entire frame, there is a risk that even the frames belonging to the same channel are determined as having a low total similarity degree. Accordingly, here, the sub-regions that are considered to include a large moving subject part and have a low local similarity degree are not used in the calculation of the total similarity degree, in order to prevent erroneous determination. As a result the influence of a moving subject is reduced, and it is possible to correctly determine whether or not compared frames belong to the same channel.

According to a third aspect of the present invention, the image processing device according to the first aspect is such that the automatic sorting unit includes a setting unit, a calculation unit, and a determination unit. The setting unit sets a specific frame included in the moving image or a frame that is obtained by combining two or more specific frames included in the moving image as a reference frame, and sets another specific frame included in the moving image as a comparative frame. The calculation unit executes calculation processing. The calculation processing is processing of detecting feature points from the comparative frame, setting a vicinity region for each feature point, and calculating a total similarity degree only using the vicinity regions. The total similarity degree is a frame-overall similarity degree between the comparative frame and the reference frame. The determination unit executes determination processing of determining, based on the total similarity degree, whether or not the comparative frame belongs to the same channel as that of the reference frame or the frames combined into the reference frame.

Here, in order to calculate the degree of similarity between the frames included in the moving image, feature points are detected from the comparative frame, and the total similarity degree between the comparative frame and the reference frame is calculated only using vicinity regions of the feature points. This total similarity degree is used as a criteria for determining whether or not the comparative frame and the reference frame belong to the same channel.

That is, here, information relating to the regions other than the vicinity regions of the feature points is not taken into consideration for the calculation of the total similarity degree. This is because, if frames are of different channels, but are of images obtained by capturing similar scenes, there is a risk that using information relating to the entire frame to determine the total similarity degree will cause a high total similarity degree to be determined. For example, in a case of two video pictures in which different places of the same shop interior are captured, the major part of the frame of both video pictures may include wallpaper, a floor, and the like in the same uniform color, and in such a case, the total similarity degree of the entire frame is high. Accordingly, here, in order to prevent erroneous determination, the regions other than the vicinity of the feature points, that is, the regions in which a background such as wallpaper and a floor in the same uniform color is possibly captured are not used in the calculation of the total similarity degree. As a result, it is possible to reduce the influence of a similar background, and to correctly determine whether or not compared frames belong to the same channel.

According to a fourth aspect of the present invention, the image processing device according to the third aspect is such that the calculation unit divides the comparative frame into a plurality of sub-regions, and detects the feature points for each sub-region from the comparative frame.

Here, in order to calculate the degree of similarity between the frames included in the moving image, the comparative frame is divided into sub-regions, and feature points are detected on a sub-region basis. As a result, the feature points are detected substantially uniformly from the entire frame without bias to a partial region of the entire screen of the frame. As a result, when the total similarity degree is calculated only using the vicinity regions of the feature points, it is possible to prevent a situation in which the total similarity degree is a value obtained by evaluating the similarity degree of a biased partial region. Accordingly, it is possible to correctly evaluate the similarity degree of the compared frames.

According to a fifth aspect of the present invention, the image processing device according to the third or fourth aspect is such that the calculation unit calculates, for each vicinity region, a local similarity degree between the comparative frame and the reference frame, and calculates the total similarity degree only using vicinity regions having a high local similarity degree.

Here, in order to calculate the degree of similarity between the frames included in the moving image, the comparative frame is divided into sub-regions, and feature points are detected on a sub-region basis. Then, a local similarity degree between the comparative frame and the reference frame is calculated on a basis of a vicinity region of each feature point, and furthermore, a total similarity degree is calculated only using the vicinity regions having a high local similarity degree.

That is, here, information relating to the vicinity regions of the feature points having a low local similarity degree is not taken into consideration for the calculation of the total similarity degree. This is because frames belonging to the same channel have the same background image except for a moving subject part. Also, there is a risk that, if the moving subject part accounts for a large ratio in the entire frame, and the total similarity degree is determined using the information relating to the entire frame, even frames belonging to the same channel will be determined to have a low total similarity degree. Accordingly, here, the regions that are considered to include a large moving subject part and have a low local similarity degree are not used in the calculation of the total similarity degree, in order to prevent erroneous determination. As a result, the influence of a moving subject is reduced, and it is possible to correctly determine whether or not compared frames belong to the same channel.

According to a sixth aspect of the present invention, the image processing device according to any one of the second to fifth aspects is such that the setting unit accepts, from a user, setting of an area in a frame screen, sets an image in the area of the specific frame included in the moving image or a frame that is obtained by combining images in the area of the two or more specific frames included in the moving image, as the reference frame, and sets an image in the area of the other specific frame included in the moving image as the comparative frame.

For example, if the target moving image to be processed is a video picture from a security camera or the like, it is often the case that the frame screen has a date and time display area. If information of the entire frame including such a date and time display area is used to determine the similarity degree between frames, there may be a risk that even frames belonging to the same channel are determined to have a low similarity degree. Furthermore, black framing may be provided in the frame screen. In such a case, conversely, if information of the entire frame including the black framing is used to determine the similarity degree of frames, there may be a list that even frames belonging to different channels are determined to have a high similarity degree. Here, in the frame screen, only an area designated by the user is used as a basis of the calculation of the similarity degree. Accordingly, it is possible to exclude the area that may cause erroneous determination from the areas serving as a basis of the similarity degree calculation.

According to a seventh aspect of the present invention, the image processing device according to any one of the second to sixth aspects is such that the setting unit is capable of setting a plurality of reference frames. The calculation unit executes, if the plurality of reference frames are set, the calculation processing on each of the reference frame. The determination unit determines, in the determination processing, that the comparative frame and the reference frame or the frames combined into the reference frame that have the highest total similarity degree belong to the same channel.

Here, it is possible to set a plurality of reference frames. Also, the comparative frame is compared with each reference frame, and is sorted to the same channel as that of the reference frame that gives the highest total similarity degree. Note that the reference frame here functions as a frame representing a predetermined channel. As a result, it is possible to correctly sort the frames included in the moving image into the plurality of channels.

According to an eighth aspect of the present invention, the image processing device according to the seventh aspect is such that the setting unit sequentially selects frames from the moving image, and sets the first selected frame as the reference frame and a frame selected thereafter as the comparative frame. Each time the setting unit newly sets a comparative frame, the calculation unit executes the calculation processing and the determination unit executes the determination processing. If it is determined, in the determination processing, that the comparative frame does not belong to the same channel as any of the reference frames or any of the frames combined into the reference frames, the setting unit again sets that comparative frame as the reference frame.

Here, the frames are sequentially selected from the moving image, and the first selected frame is set as a reference frame representing a predetermined channel. Furthermore, the frame selected, secondly onward is first set as a comparative frame. Then, the comparative frame is compared with each previously set reference frame, and if it is determined that the comparative frame does not belong to any of the channels corresponding to the reference frames, the comparative frame is again set as a reference frame representing a new channel. According to this method, it is possible to prevent comparison with, for example, the frames included in the moving image in an all-to-all manner, and to sort the frames included in the moving image into the plurality of channels while suppressing the calculation load.

According to a ninth aspect of the present invention, the image processing device according to the seventh or eighth aspect is such that the setting unit sequentially selects frames from the moving image, and sets the first selected frame as the reference frame and a frame selected thereafter as the comparative frame. Each time the setting unit newly sets a comparative frame, the calculation unit executes the calculation processing and the determination unit executes the determination processing. If it is determined, in the determination processing, that the comparative frame belongs to the same channel as any of the reference frames or any of the frames combined into the reference frames, the setting unit combines that comparative frame with the reference frame.

Here, the frames are sequentially selected from the moving image, and the first selected frame is set as a reference frame representing a predetermined channel. Furthermore, the frames selected secondly onward are first set as a comparative frame. Then, the comparative frame is compared with each previously set reference frame, and if it is determined that the comparative frame belongs to any one of the channels corresponding to the reference frames, the comparative frame is combined with the reference frame. According to this method, the reference frame representing a predetermined channel is an image correctly representing various frames belonging to the channel, and it is possible to correctly sort the frames included in the moving image by the plurality of channels.

According to a tenth aspect of the present invention, the image processing device according to the eighth or ninth aspect is such that, if the plurality of reference frames are set, after the final frame has been selected from the moving image and the calculation processing and the determination processing have ended, the calculation unit calculates a similarity degree between the plurality of reference frames. The determination unit combines channels that correspond to reference frames that have a high similarity degree between the plurality of reference frames into one channel.

Here, after determination of the automatic sorting with respect to each frame has ended, the similarity degree between the channels is determined again. Accordingly, it is possible to reduce the number of channels that are ultimately detected by the automatic sorting and to improve the accuracy in the sorting of the channels.

According to an eleventh aspect of the present invention, the image processing device according to any one of the eighth to tenth aspects is such that, after the final frame has been selected from the moving image and the calculation processing and the determination processing have ended, the determination unit deletes the channel to which only a predetermined number or less of frames belong.

Here, after determination of the automatic sorting with respect to each frame has ended, if there is a channel to which only a predetermined number or less of frames belongs, such a channel is deleted. Accordingly, it is possible to prevent a situation in which a channel that is not regarded as a respectable channel is included in the final result of the automatic sorting, improving the accuracy in sorting of channels.

According to a twelfth aspect of the present invention, the image processing device according to any one of the first to eleventh aspects is such that the similarity degree is a correlation coefficient.

Here, it is possible to sort the frames included in the moving image into the plurality of channels, based on the correlation coefficient between the frames.

According to a thirteenth aspect of the present invention, an image processing program is configured to sort frames included in one moving image into different channels, the frames included in the moving image being a mixture of frames belonging to the different channels, and causes a computer to execute a sorting step of calculating a similarity degree of the plurality of frames included in the moving image by performing image processing on the frames, and sorting the plurality of frames into the plurality of channels based on the similarity degree. Here, the same effects as those of the first aspect can be achieved.

According to a fourteenth aspect of the present invention, the image processing program according to the thirteenth aspect is such that the sorting step includes the steps of: setting a specific frame included in the moving image or a frame that is obtained by combining two or more specific frames included in the moving image as a reference frame; setting another specific frame included in the moving image as a comparative frame; dividing the comparative frame and the reference frame into a plurality of sub-regions; calculating a local similarity degree between the comparative frame and the reference frame for each sub-region; calculating a total similarity degree, which is a frame-overall similarity degree, between the comparative frame and the reference frame only using sub-regions having a high local similarity degree; and executing determination processing of determining, based on the total similarity degree, whether or not the comparative frame belongs to the same channel as that of the reference frame or the frames combined into the reference frame. Here, the same effects as those of the second aspect can be achieved.

According to a fifteenth aspect of the present invention, the image processing program according to the thirteenth aspect is such that the sorting step includes the steps of: setting a specific frame included in the moving image or a frame that is obtained by combining two or more specific frames included in the moving image as a reference frame; setting another specific frame included in the moving image as a comparative frame; detecting feature points from the comparative frame; setting a vicinity region for each feature point; calculating a total similarity degree, which is a frame-overall similarity degree, between the comparative frame and the reference frame only using the vicinity regions; and determining, based on the total similarity degree, whether or not the comparative frame belongs to the same channel as that of the reference frame or the frames combined into the reference frame. Here, the same effects as those of the third aspect can be achieved.

Advantageous Effects of Invention

According to the present invention, it is possible to separate a moving image that includes a mixture of frames belonging to different channels into moving images for the respective channels, regardless of the specification of the moving image. That is, when one moving image includes a mixture of frames that belong to different channels, reproduction for each channel is possible regardless of specifications by which the moving image was recorded.

BRIEF DESCRIPTION OF DRAWINGS

FIG. 15 is a schematic diagram illustrating another method to calculate a similarity degree according to the third embodiment of the present invention.

FIG. 18 is a diagram illustrating impression defining information.

DESCRIPTION OF EMBODIMENTS

Hereinafter, an image processing device and an image processing program according to some embodiments of the present invention will be described with reference to the drawings.

1. First Embodiment

<1-1. Summary of Image Processing Device>

Figure 1:
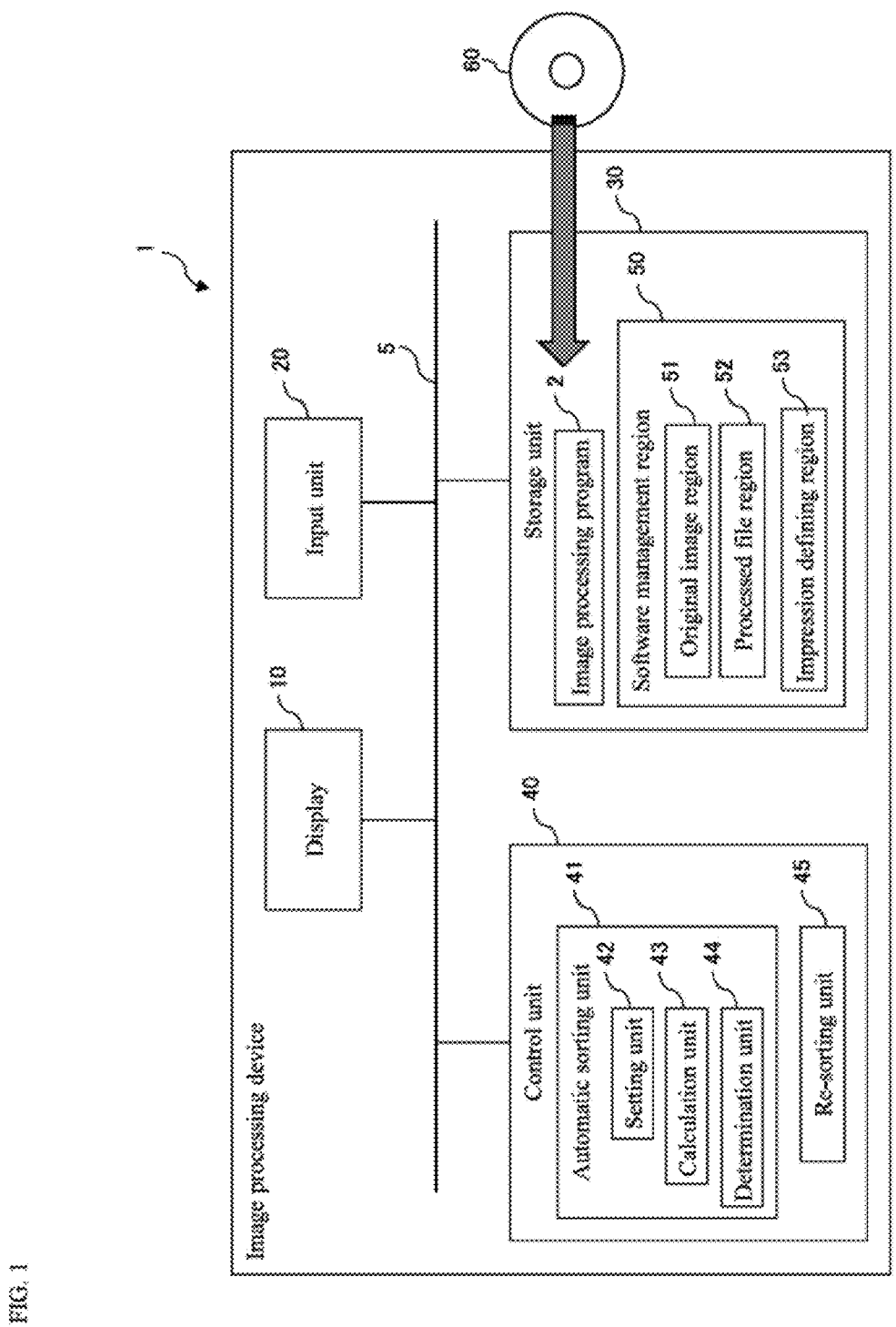
FIG. 1 is a block diagram illustrating an image processing device according to a first embodiment of the present invention.

An image processing device 1 of FIG. 1 shows an embodiment of the image processing device according to the present invention. The image processing device 1 is a general-purpose personal computer. An image processing program 2, which is an embodiment of an image processing program according to the present invention, is provided and installed in the image processing device 1, for example, from a computer readable storage medium 60 such as a CD-ROM, DVD-ROM, or a USB memory that stores the image processing program 2. The image processing program 2 is application software for assisting in image processing to be performed on a moving image and a still image. The image processing program 2 causes the image processing device 1 to execute steps included in the operations that will be described later.

The image processing device 1 includes a display 10, an input unit 20, a storage unit 30, and a control unit 40. These units 10 to 40 are connected to each other via, for example, a bus line or cable 5, and can suitably perform communication with each other. The display 10 is constituted by a liquid crystal display or the like, and displays, to a user, a screen or the like that will be described later. The input unit 20 is constituted by a mouse, a keyboard, and the like, and accepts a user operation on the image processing device 1. The storage unit 30 is a nonvolatile storage area that is constituted by a hard disk, or the like. The control unit 40 is constituted by a CPU, a ROM, a RAM, and the like.

The image processing program 2 is stored in the storage unit 30. The storage unit 30 secures a software management region 50. The software management region 50 is a region for use by the image processing program 2. The software management region 50 secures an original image region 51, a processed file region 52, and an impression defining region 53. The functions of the regions 51 to 53 will be described later.

By reading out and executing the image processing program 2 stored in the storage unit 30, the control unit 40 virtually operates as an automatic sorting unit 41 and a re-sorting unit 45. Furthermore, the automatic sorting unit operates also as a setting unit 42, a calculation unit 43, and a determination unit 44. The operations of the units 41 to 45 will be described later in detail.

<1-2. Details of Configuration and Operation of Image Processing Device>

Figure 2:
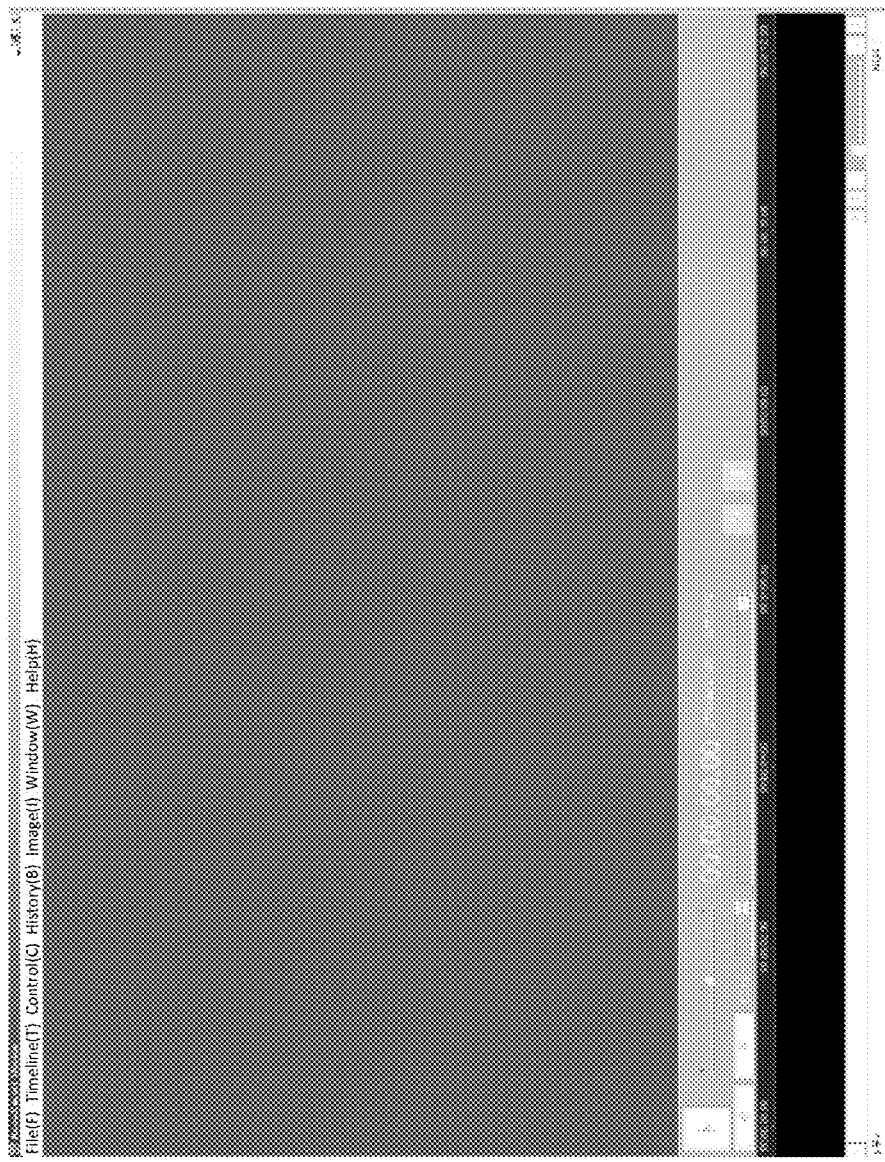
FIG. 2 is a diagram illustrating a basic screen before image data is loaded.

Upon detecting that the user has performed a predetermined operation via the input unit 20, the control unit 40 starts the image processing program 2. After the start-up of the image processing program 2, a basic screen W1 (see FIG. 2) is displayed on the display 10. Note that display of all elements such as screens, windows, and buttons displayed on the display 10 is controlled by the control unit 40.

<1-2-1. Image Data Loading>

The basic screen W1 accepts, from the user, an instruction to load image data to the original image region 51. The image data loaded to the original image region 51 is to be subjected to reproduction processing, image processing, and channel separation processing, which will be described later. The control unit 40 loads image data from a still image file or a moving image file to the original image region 51. Note that in the present specification, "still image file" refers to a data file in a still image format and "moving image file" refers to a data file in a moving image format.

In the case of loading image data from a still image file, the user operates the input unit 20 so as to designate one still image file or one folder. In the case of the former, the control unit 40 prompts the user to input the address path of this still image file in the storage unit 30 and the file name thereof. In the case of the latter, the control unit 40 prompts the user to input the address path of this folder in the storage unit 30 and the folder name thereof. Then, the control unit 40 saves the designated still image file or all still image files in the designated folder, as a still image file group, in the original image region 51. Note that in the present specification, "group" does not necessarily include a plurality of elements but may be one element.

On the other hand, in the case of loading of image data from a moving image file, the user operates the input unit 20 so as to input the address path of the one moving image file in the storage unit 30 and the file name thereof. Upon detecting that the user has designated the moving image file, the control unit 40 displays a moving image load window (not shown) on the basic screen W1 in a superimposed manner. The moving image load window accepts, from the user, the selection of an arbitrary segment from among the entire segment on the time-line of the designated moving image file. Upon detecting that the user has selected a specific segment via the input unit 20, the control unit 40 generates a still image file group that has a one-to-one correspondence with a frame group included in the segment of the designated moving image file. Then, the control unit 40 saves the still image file group in the original image region 51. Accordingly in the present embodiment image data that is to be subjected to reproduction processing and channel separation processing, which will be described later, is not of a moving image file but of a still image file.

Note that even if the still image file group loaded to the original image region 51 is derived from a still image file instead of a moving image file, the control unit 40 recognizes that the still image file group is sequenced along one time-line. The sequence is automatically made based on a file attribute or the like.

<1-2-2. Reproduction Processing>

After the still image file group is loaded to the original image region 51, the control unit 40 displays display windows W2 (see FIG. 3) on the basic screen W1 in a superimposed manner. The number of generated display windows W2 corresponds to the number of time-lines of the still image file group loaded to the original image region 51.

First, one still image file (for example, the still image file of the first frame in the time-line) that is included in the still image file group loaded to the original image region 51 is displayed in a display window W2. Then, as will be described later, the frame that is displayed in the display window W2 is switched upon an operation of the user.

Figure 3:
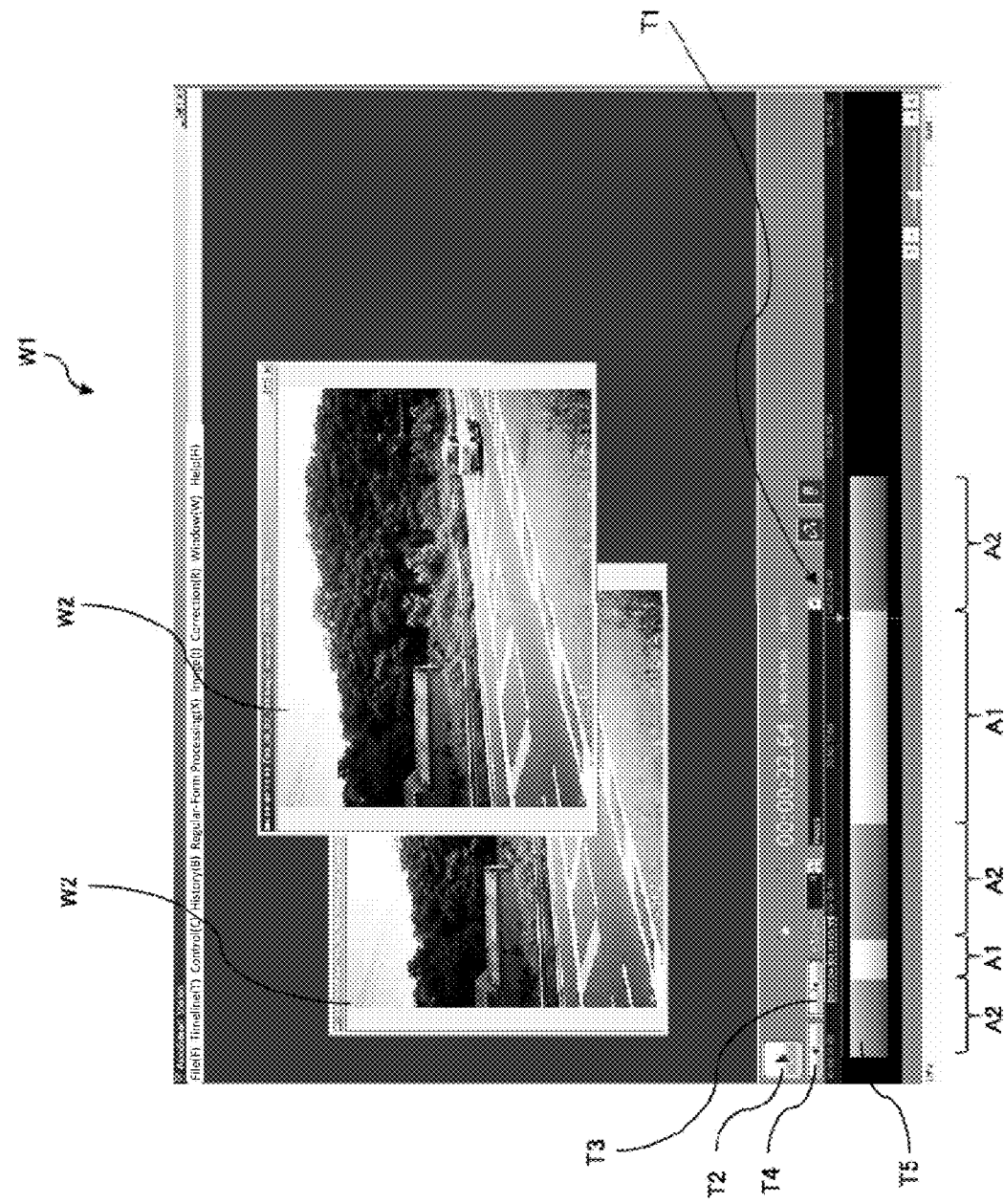
FIG. 3 is a diagram illustrating the basic screen after the image data is loaded.

The control unit 40 can reproduce, within a display window W2, the frame group that belongs to the time-line corresponding to this display window W2, as a moving image. Here, as shown in FIG. 3, a window selection pull-down menu T1, a play button T2, a next frame button T3, a previous frame button T4, and a time-line bar T5 are arranged on the basic screen W1.

Even if a plurality of display windows W2 are present, there is one active display window W2. The window selection pull-down menu T1 accepts, from the user, the selection of which display window W2 is to serve as the active display window W2. Hereinafter, the time-line that corresponds to the active display window W2 is referred to as "active time-line", and the frame group that belongs to the active time-line is referred to as "active frame group". Furthermore, the frame that is currently displayed in the active display window W2 is referred to as "active display frame".

The play button T2 accepts an instruction to reproduce the active frame group as a moving image from the user. Upon detecting that the user has pressed the play button T2 via the input unit 20, the control unit 40 displays, within the active display window W2, the frames included in the active frame group sequentially along the time-line in a frame-by-frame format. Note that the reproduction starts from the active display frame at a point in time when the play button T2 is pressed. Furthermore, the play button T2 accepts an instruction to stop the reproduction from the user. Upon detecting that the user has pressed the play button T2 via the input unit 20 during the reproduction, the control unit 40 fixes the display of the active display window W2 to the active frame at that point in time.

The next frame button T3 and the previous frame button T4 respectively accept, from the user, instructions to switch the active display frame to the next frame and to the previous frame along the active time-line.

The time-line bar T5 is an object schematically showing the active time-line. The time-line bar T5 is equally divided as per the number of frames included in the active frame groups in the direction in which the bar extends. The divided region from the left of the time-line bar T5 corresponds to the frame of the active time-line (n is a natural number).

As shown in FIG. 3, the time-line bar T5 displays a divided region A1 that corresponds to a selected frame group and a divided region A2 that corresponds to a non-selected frame group in different modes. "Selected frame group" refers to a frame group that corresponds to a currently selected segment of the active time-line. "Non-selected frame group" refers to a frame group that corresponds to a currently non-selected segment of the active time-line.

The time-line bar T5 accepts the selection of an arbitrary segment in the active time-line from the user. In other words, by operating the divided region on the time-line bar T5 via the input unit 20, the user can select an arbitrary number of arbitrary frames from among the active frame group. The control unit 40 recognizes the selected frame group as a target of image processing and channel separation processing, which will be described later. Note that, each time the user selects a divided region of the time-line bar T5, the active display frame is switched to the frame that corresponds to the most recently selected divided region.

<1-2-3. Image Processing>

Hereinafter, the image processing that is to be performed on the selected frame group will be described. The control unit 40 can execute, with respect to the selected frame group, a plurality of image processing modules such as noise removal, sharpness, brightness/contrast/chroma adjustment, image resolution, rotation, addition of characters/arrows/mosaics, and image averaging. The image processing modules are incorporated in the image processing program 2.

The user can select arbitrary modules from the image processing modules in an arbitrary order for an arbitrary number of times, by performing an operation on the basic screen W1 via the input unit 20. Each time the control unit 40 detects that the user has selected an image processing module, the control unit 40 executes the image processing module with respect to the selected frame group at that point in time.

As the image processing module is sequentially executed with respect to a frame once, twice, trice, . . . , the frame is sequentially processed to a first-order frame, a second-order frame, a third-order frame, . . . . The 0-order frame corresponds to the still image file saved in the original image region 51. The (m+1)-order frame corresponds to the still image file obtained by executing the image processing module once with respect to the still image file corresponding to the m-order frame (m is an integer of 0 or more). The control unit 40 sequentially generates the still image files that correspond to the first-order frames onward, and saves these still image files separately in the processed file region 52.

Figure 4:
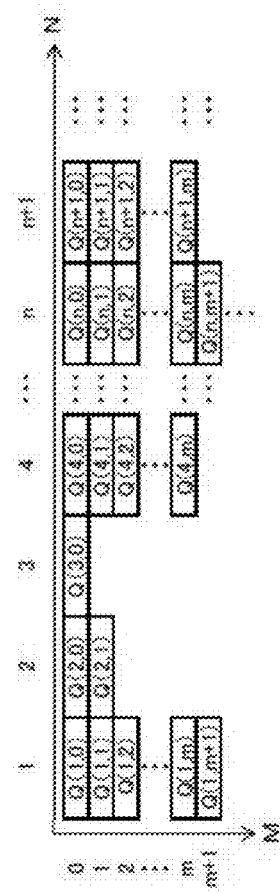
FIG. 4 is a diagram illustrating a still image group that belongs to one time-line.

FIG. 4 is a schematic diagram illustrating how the still image group that belongs to one time-line is managed by the image processing program 2. In FIG. 4, the horizontal N axis denotes the order of frames on the time-line, and the vertical M axis denotes the order of processing. Each square of FIG. 4 that corresponds to the coordinates (n, m) in the N-M space denotes a still image Q (n, m). The still image Q (n, m) is the m-order still image of the n-$^{th}$ frame on the time-line (n is a natural number and m is an integer of 0 or more).

The control unit 40 manages, for each frame, the value of the currently selected coordinate m as a parameter $m_s$. Immediately after the still image file group is loaded to the original image region 51, the coordinate $m_s$ has the default value 0. Then, the coordinate $m_s$ is of the frame is incremented by 1 each time the image processing module is executed. Furthermore, the user can freely change the coordinate $m_s$ of a selected frame group by performing a predetermined operation via the input unit 20. Note that executing an image processing module with respect to a frame refers to executing the image processing module with respect to the $m_s$-order still image of this frame. Accordingly, changing the coordinate $m_s$ means changing the target with respect to which the image processing module is to be executed. Displaying a frame refers to displaying the still image of the coordinate $m_s$ of this frame. Accordingly, changing the coordinate $m_s$ also means changing the target to be displayed in the active display window W2.

<1-3. Channel Separation Processing>

Hereinafter, the channel separation processing that is implemented in the image processing program 2 will be described. "Channel separation processing" refers to processing for separating a moving image that includes a mixture of video pictures belonging to different channels into moving images for the respective channels. That is, the moving image to be subjected to the channel separation processing is typically a moving image (hereinafter, referred to as "mixed time-lapse moving image") into which a plurality of moving images recorded using a time-lapse method are mixed on one time-line in a manner such that a video picture of each moving image is embedded into a time period gap of the other moving image. "Mixed time-lapse moving image" is a moving image in which video pictures of a plurality of channels are switched alternately along a time-line.

The channel separation processing is executed on a selected frame group. The execution of the channel separation processing needs a plurality of frames. Accordingly, it is presumed that, in a state in which the selected frame group includes only one frame, an operation button or the like for starting the channel separation processing is disenabled and the channel separation processing cannot be started. Alternatively, if the selected frame group includes only one frame but there are a plurality of frames on an active time-line, all of the frames on the active time-line may be set to be subjected to the channel separation processing. Hereinafter, the frame group to be subjected to the channel separation processing is referred to as "target frame group". Furthermore, the moving image that is constituted by a target frame group is referred to as "target moving image".

The channel separation processing includes automatic sorting processing for automatically sorting a plurality of frames included in a target moving image by a plurality of channels, and re-sorting processing in which a user corrects a sorting result of the automatic sorting processing by a manual operation.

The automatic sorting processing is executed by the automatic sorting unit 41. The automatic sorting processing is processing for performing image processing on a plurality of frames included in a target moving image so as to automatically sort the frames by a plurality of channels. Specifically, the automatic sorting unit 41 calculates a degree of similarity between frames, and sorts the plurality of frames included in the target moving image by a plurality of channels based on the degree of similarity. The degree of similarity between frames is calculated as an index of whether or not the compared frames belong to the same channel. As a result of the automatic sorting processing, although the automatic sorting processing will be described later in detail the plurality of channels are detected. Each channel includes a plurality of frames. Note that as long as a mixed time-lapse moving image is subjected to the automatic sorting processing, a plurality of channels are usually detected, but there may be a case where only one channel is detected as a result of the automatic sorting processing. Furthermore, in the automatic sorting processing, a sort label "non-sorted" is given to the frame that is determined as not belonging to any channel. Accordingly, as a result of automatic sorting processing, the channel name of the corresponding channel or the label "non-sorted" is given to each of the frames included in the target moving image.

The re-sorting processing is executed by the re-sorting unit 45. The re-sorting processing is processing for individually sorting an arbitrary frame included in the target moving image to an arbitrary channel in accordance with a user operation. Specifically, in the re-sorting processing, the non-sorted frame that has not been sorted to any channel by the automatic sorting processing can be individually sorted to a specific channel. Furthermore, the frame that has been sorted to a wrong channel by the automatic sorting processing can also be sorted to another correct channel. Accordingly when the user considers the result of the automatic sorting processing as wrong, he or she can correct the channel to which the problematic frame belongs in a unit of a frame. Furthermore, in the re-sorting processing, it is also possible to create a new channel or combine a plurality of channels into one channel in accordance with a user operation. That is, the re-sorting processing is used for manual collection of a result of the automatic sorting processing.

Upon detecting that the user has performed a predetermined operation via the input unit 20, the automatic sorting unit 41 starts the channel separation processing. After the start-up of the channel separation processing, the setting unit 42 first displays an area setting window W3 for displaying a selected frame (see FIG. 5) while overlapping it with the basic screen W1. The area setting window W3 is a screen for accepting, from a user, the designation of an area in a selected frame such that the area serves as a reference for calculating the similarity degree between frames in the automatic sorting processing. "Selected frame" refers to one frame included in a target frame group, and may be, for example, the first frame of the target frame group along the time-line, or the active display frame. Note that although it is clear from the description above, the active display frame is the frame that was most recently selected on the time-line bar T5, and thus is sure to be included in the target frame group.

Figure 5:
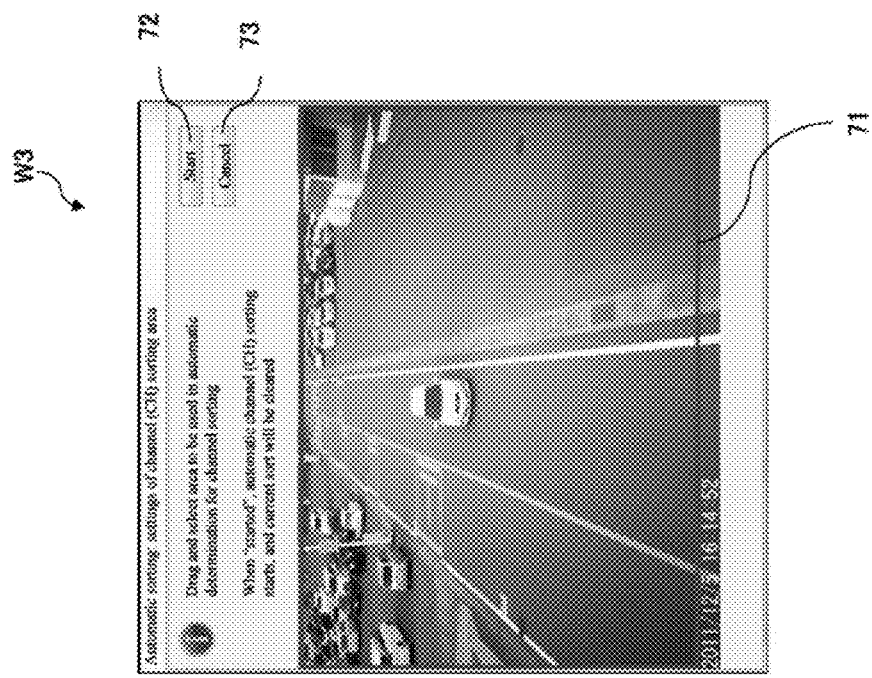
FIG. 5 is a diagram illustrating an area setting window.

If the target moving image is a video picture from a security camera or the like, it is often the case that the frame screen has a date and time display area (in the lower left part in the example of FIG. 5). If information of the entire frame including such a date and time display area is used to determine the similarity degree between frames, there may be a risk that even frames belonging to the same channel are determined to have a low degree of similarity. Furthermore, black framing may be provided in the frame screen. In such a case, conversely, if information regarding the entire frame including the black framing is used to determine the similarity degree of frames, there may be a risk that even frames belonging to different channels are determined to have a high degree of similarity. Also in a case where the target moving image is a mixed time-lapse moving image that is constituted by video pictures from security cameras placed in different elevators, the degree of similarity between frames belonging to different channels is likely to be determined as being high. This is because the scenes in the elevators are similar to each other. The area setting window W3 avoids such a situation, and is useful for excluding the area that may cause erroneous determination from the areas serving as a basis of the similarity degree calculation, so that the degree of similarity between frames that is to be calculated in the automatic sorting processing serves as a correct index indicating whether or not the frames belong to the same channel. Specifically, the user designates an area that characterizes the background of each channel in the selected frame of the area setting window W3. Taking the elevator as an example, the user only needs to designate the area in which a poster or the like that characterizes the scene of an elevator is captured. When the user performs an operation using a mouse or the like to designate an arbitrary area in the selected frame on the area setting window W3, an enclosing line 71 that indicates the area designated by the user is displayed in the selected frame. Accordingly, the user can check whether or not a correct area is designated.

Then, when the user has pressed a start button 72 on the area setting window W3, the automatic sorting unit 41 detects this fact and the automatic sorting processing, which will be described later, starts. Also, at the same time, the area setting window W3 is closed. Note that, when the start button 72 has been pressed in the state in which no area is designated in the selected frame, the entire frame screen is used as a basis of the similarity degree calculation in the automatic sorting processing. A cancel button 73 is a button for cancelling area designation via the area setting window W3.

During execution of the automatic sorting processing, a dialog box for showing the progress situation of the automatic sorting processing is displayed. Then, when the automatic sorting processing ends, the dialog box is closed, and the re-sorting unit 45 starts re-sorting processing. The automatic sorting processing will be described later in detail. The re-sorting unit 45 first displays a re-sorting window W4 shown in FIG. 6, which serves as a user interface for performing re-sorting after the automatic sorting processing, while overlapping it with the basic screen W1.

Figure 6:
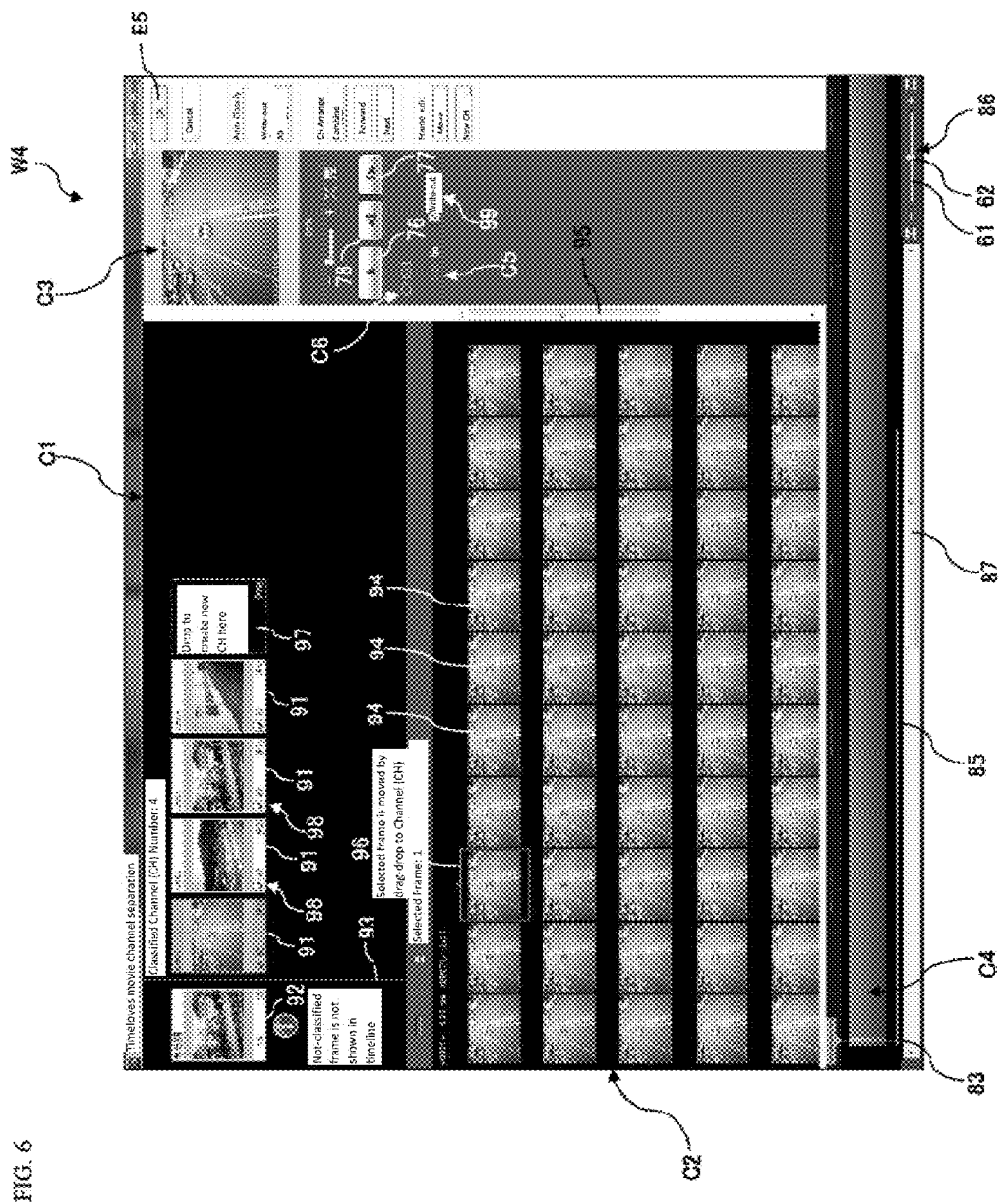
FIG. 6 is a diagram illustrating a re-sorting window.

A channel list area C1, a frame list area C2, a play area C3, and a time-line bar C4 are arranged on the re-sorting window W4. In the channel list area C1, channel objects 91 that respectively correspond to channels detected in the automatic sorting processing are arranged. In the example of FIG. 6, four channel objects 91 that correspond to four channels CHO1, CHO2, CHO3, and CHO4 are sequenced. In the present embodiment, the channel objects 91 have an icon format.

As shown in FIG. 6, the channel objects 91 respectively indicate the channel names CHO1, CHO2, and the like of the corresponding channels. Furthermore, each channel object 91 indicates a thumbnail image of the representative frame that represents a plurality of frames belonging to the corresponding channel. The representative frame is suitably switched in response to a user operation that will be described later, but the default frame is, for example, the first frame, along the time-line, of the frames belonging to the corresponding channel. Note that, although not shown in FIG. 6, if the number of channels is so large that the channel objects 91 corresponding to all of the channels cannot be arranged in the channel list area C1, a scroll bar will appear in the area C1, and the area C1 will actually be expanded. Furthermore, each channel object 91 also indicates the number of frames belonging to the corresponding channel. The number of frames changes in response to a user operation that will be described later, and the display of the number of frames in the channel object 91 will be switched in real time is accordance with the change.

Furthermore, in addition to the channel objects 91, a non-sorted object is also arranged in the channel list area C1. The non-sorted object 92 is an object that corresponds to the sort in which non-sorted frames that are included in the target frame group and do not belong any channel are put together. Note that "the sort in which non-sorted frames are put together" does not correspond to an actual channel, but virtually constitutes one channel in the sense that the frames are put together. Therefore, the non-sorted object 92 has a shape similar to that of the channel objects 91, and has, in the present embodiment, an icon that has the same size as that of the channel objects 91. Specifically, the non-sorted object 92 displays "non-sorted", in place of the channel name, and indicates the number of non-sorted frames, in place of the number of frames belonging to the corresponding channel. The display of the non-sorted object 92 with the number of frames is also switched in real time in accordance with the change in the number of non-sorted frames. Furthermore, also the non-sorted object 92 displays a thumbnail image of the representative frame that represents the "non-sorted" frames. This representative frame is also suitably switched in response to a user operation that will be described later, but the default frame is, for example, the first frame, along the time-line, of the frames belonging to the sort "non-sorted". In the present embodiment, a border line 93 is drawn between the non-sorted object 92 and the channel objects 91.

The re-sorting unit 45 accepts, from a user, a selection operation for selecting an arbitrary object from among all of the channel objects 91 and the non-sorted object 92 in the channel list area C1. The object currently selected from among all of the objects 91 and 92 is displayed in a different mode from the other objects. In the example of FIG. 6, the object 91 of the channel CHO1 is displayed in a color different from the other objects 91 and 92. Hereinafter, the channel or sort that corresponds to the currently selected one of the objects 91 and 92 is referred to as "selected channel".

In the frame list area C2, thumbnail images 94 of all of the frames belonging to the selected channel are displayed in a list. Note that if the number of frames belonging to the selected channel is so large that all of the thumbnail images 94 cannot be arranged in the frame list area C2, a scroll bar 95 will appear in the area C2, and the area C2 will actually be expanded. Accordingly, by switching the selection state of the objects 91 and 92, the user can selectively display, in the frame list area C2, all of the non-sorted frames or all of the frames belonging to the corresponding channel in a list. Accordingly it is possible to check all of the non-sorted and sorted frames included in the target frame group while advantageously using the limited space in the frame list area C2. Particularly, even if a wrong frame is sorted to a channel, the wrong frame will easily be found according to the list display mode. Note that, in the present embodiment, the thumbnail images 94 in the channel list area C1 can be sequenced in multiple stages, and are arranged in a time-series order from left to right and from upper to lower with an increase in the number n of the original frame on the time-line.

The re-sorting unit 45 manages one specific frame belonging to each channel as an active frame, and also manages one specific non-sorted frame as an active frame. In the frame list area C2, an enclosing box 96 is added to the thumbnail image 94 of the active frame as a mark for distinguishing this thumbnail image 94 from the thumbnail images 94 of the other frames. Each thumbnail image 94 in the frame list area C2 is recognized as an object, and the user can select, with a click operation or the like, an arbitrary thumbnail image 94 from among all of the thumbnail images 94 in the frame list area C2. Furthermore, the user can also select a plurality of thumbnail images 94 in the frame list area C2 at the same time, by repeatedly performing click operations while pressing down a specific key on a keyboard, for example. Each time a thumbnail image 94 is selected in the frame list area C2, the re-sorting unit 45 switches the active frame of the selected channel to the fame that corresponds to the most recently selected thumbnail image 94. At this time, the position of the enclosing box 96 also moves. Furthermore, the active frame is associated with the thumbnail images that are indicated by the channel objects 91 and the non-sorted object 92, and each time the active frame of each channel or sort is changed, the thumbnail image of the object 91 or 92 that corresponds to the channel or sort is also switched. That is, in the present embodiment, the representative frame of each channel or sort corresponds to the active frame.

The thumbnail image 94 of the active frame in the frame list area C2 can be individually moved so as to overlap with any of the objects 91 and 92 in the channel list area C1 by a drag-and-drop operation. Furthermore, if a plurality of thumbnail images 94 are selected at the same time in the frame list area C2, the plurality of thumbnail images 94 can be moved altogether so as to overlap with any of the objects 91 and 92 in the channel list area C1. (Note that the thumbnail images 94 can be "moved" but if the thumbnail images 94 are released on the target object 91 or 92, they will disappear as if they have been inserted into a folder. In other words, the re-sorting unit 45 accepts, from a user, an operation for associating an arbitrary thumbnail image 94 in the frame list area C2 with an arbitrary channel or sort. After the associating operation, the frame that corresponds to the thumbnail image 94 that was moved by this operation is sorted again (re-sorted) to the channel or sort that corresponds to the object 91 or 92 to winch the thumbnail image 94 was moved. Note that if the frame corresponding to the thumbnail image 94 as per the operation was originally sorted to the channel or sort that corresponds to the object 91 or 92 as per the operation, the operation will be ignored and the re-sorting will not be performed.

As shown in FIG. 6, in the channel list area C1, a new creation object 97 is arranged after the sequence of the objects 91 and 92. The new creation object 97 is an object for creating a new channel, and has an icon format in the present embodiment. Also, the same operation as the above-described association operation can be performed on not only the objects 91 and 92 but also the new creation object 97. Specifically, the re-sorting unit 45 accepts, from a user, an operation for independently moving the thumbnail image 94 of the active frame in the frame list area C2 so that if overlaps with the new creation object 97 with a drag-and-drop operation. Furthermore, if a plurality of thumbnail images 94 in the frame list area C2 are selected at the same time, the plurality of thumbnail images 94 can be moved altogether so as to overlap with the new creation object 97. (Note that the thumbnail images 94 can be "moved", but if the thumbnail images 94 are released on the new creation object 97, they will disappear as if they have been inserted into a folder.) After the association operation, a channel object 91 is newly created at the position at which the new creation object 97 was present.

The newly created channel object 91 is an object indicating a new channel that includes, as an element or elements, a frame or frames corresponding to one or more thumbnail images 94 moved by the association operation. In other words, the frame or the frames that corresponds or corresponds to one or more thumbnail images 94 moved by the association operation, is or are re-sorted to the new channel. Accordingly, if only one thumbnail image 94 was moved, the thumbnail image 94 will be displayed on the object 91 immediately after the channel object 91 is newly created. On the other hand if a plurality of thumbnail images 94 were moved, one of these thumbnail images 94 (for example, the most recently selected thumbnail image 94) will be displayed on the newly created channel object 91. Also a channel name is suitably given and displayed. Furthermore, the new creation of the channel object 91 involves movement of the new creation object 97 behind the sequence of the objects 91 and 92 including the newly created object 91.

After the re-sorting of the frame with the above-described association operation, the channel name CHO1, CHO2, or the like or the label "non-sorted" is again given to the re-sorted frame, based on the channel or sort to which the frame is re-sorted. Furthermore, the thumbnail image 94 of the re-sorted frame is deleted from the frame list area C2. Here, the remaining thumbnail images 94 are aligned in the frame list area C2 so as to fill up the space in which the deleted thumbnail image 94 was arranged. Note that the re-sorted frame or frames does or do not fail to include an active frame. Accordingly, after re-sorting, the active frame of the selected channel is changed to the nearest one of the subsequent frames along the time-line, or to the nearest one of the prior frames along the time-line. The change of the active frame of the selected channel is suitably reflected by the location of the enclosing box 96, and the indication of the thumbnail image on the object 91 or 92. Furthermore, the number of frames belonging to the channel and/or sort that corresponds to the object 91 or 92 from which the re-sorted frame has been moved and to which the re-sorted frame has been moved are again calculated, and are reflected in the display of the object 91 or 92.

Furthermore, the various above-described association operations can be realized by another method than the drag-and-drop operation. Specifically, as shown in FIG. 6, character strings that indicate keyboard-specific keys are indicated in the lower right parts of the objects 91, 92, and 97 in the frame list area C2. Upon detecting that the specific key indicated in the object 91, 92, or 97 has been pressed, the re-sorting unit 45 determines that the active frame of the currently selected channel, that is, the frame to which the enclosing box 96 is currently applied in the frame list area C2 has been associated with the object 91, 92, or 97 that corresponds to the specific key. The processing thereafter is the same as in the case in which the association operation is performed using a drag-and-drop operation.

Furthermore, the re-sorting unit 45 can also combine a plurality of channels (including the sort "non-sorted" in the present and the next paragraphs) with each other in response to a user operation. Specifically, in the channel list area C1, an arbitrary object 91 or 92 can be individually moved so as to overlap with another object 91 or 92 by a drag-and-drop operation. Furthermore, it is also possible that a plurality of objects 91 and 92 are selected at the same time, and are moved altogether over another object 91 or 92. (Note that the objects 91 and 92 can be "moved", but if the objects 91 and 92 have been released on a destination object 91 or 92, they will disappear as if they are inserted into a folder.) In other words, the re-sorting unit 45 accepts, from a user, an operation for associating an arbitrary channel in the list area C1 with another an arbitrary channel. After the association operation, the channel that corresponds to the object 91 or 92 that was moved by the operation is combined with the channel that corresponds to the other object 91 or 92 to which the object 91 or 92 was moved.

After the combination of the channels with the above-described association operation, the label of the channel name, such as "non-sorted", or CHO1, CHO2, . . . , of the channel that corresponds to the destination object 91 or 92 is again given to all of the frames belonging to the channel that corresponds to the object 91 or 92 that was moved. As a result, the destination object 91 or 92 serves as an object indicating the combined new channel. The active frame of the destination object 91 or 92 is continuously used as the active frame of the combined channel. Furthermore, the re-sorting unit 45 calculates the number of frames belonging to the combined channel, and reflects the number on the indication of the object 91 or 92. Furthermore, in the channel list area C1, if a channel object 91 is moved, the moved channel object 91 disappears, and the remaining objects 91 and 97 are aligned so as to fill up the space in which the channel object 91, having disappeared, was arranged. If the non-sorted object 92 is moved, the number of frames is zero, but the non-sorted object 92 remains as is.

Furthermore, if there are a plurality of channel objects 91, the order of the sequence of these objects 91 in the channel list area C1 can be changed suitably by a drag-and-drop operation. For example, if, in the state of FIG. 6, the channel object 91 of the channel CHO1 is attempt to be moved to the right of the channel object 91 of the channel CHO2, the channel object 91 of the channel CHO1 only needs to be moved between the channel objects 91 of the channels CHO2 and CHO3.

Hereinafter, the play area C3 will be described. In the play area C3, the frame group belonging to a selected channel can be reproduced as a moving image. As shown in FIG. 6, a play button 76, a next frame button 77, and a previous frame button 78 are arranged on the re-sorting window W4.

The play button 76 accepts, from a user, an instruction to reproduce the frame group belonging to a selected channel as a moving image. Upon detecting that the play button 76 has been pressed, the re-sorting unit 45 displays, in the play area C3, the frames included in the frame group belonging to the selected channel sequentially along the time-line in a frame-by-frame format. The reproduction starts from the active frame of the selected channel at a point in time when the play button 76 is pressed. Furthermore, the reproduction is performed at the frame rate according to the selected channel. Also, during the reproduction, the frame displayed in the play area C3 will be switched sequentially but at each switch, the active frame managed by the re-sorting unit 45 is updated to the switched frame in real time. Furthermore, the play button 76 accepts, from a user, an instruction to stop the reproduction. Upon detecting that the play button 76 has been pressed during the reproduction, the re-sorting unit 45 fixes the display in the play area C3 to the active frame at that point in time. Note that also when stopped, the active frame of the selected channel is constantly displayed in the play area C3. Accordingly, when the active frame is changed during the stop by the operation of selecting a thumbnail image 94 in the frame list area C2, the display in the play area C3 is also changed in real time.

Furthermore, during the reproduction, the active frame is updated as needed, and the enclosing box 96 in the frame list area C2 also moves to the position to enclose the thumbnail image 94 of the most recent active frame in real time. Furthermore, at this time, the thumbnail image of the object 91 or 92 that corresponds to the selected channel is updated in real time. That is, the display in the play area C3 is synchronized with the position of the enclosing box 96 and the display of the thumbnail image of the object 91 or 92. However, another embodiment may have a configuration in which no such synchronization is made during reproduction. In this case, it is also possible to configure such that, for example, first when reproduction is stopped, the position of the enclosing box 96 is moved, and/or, the thumbnail image of the object 91 or 92 is updated.

The next frame button 77 and the previous frame button 78 respectively accept, from a user, instructions to switch display in the play area C3 to the next frame and to the previous frame, along the time-line, of the frame group belonging to the selected channel. The change of the display in the play area C3 with the operation rising the buttons 77 and 78 is also associated with the change of the active frame.

The above-described reproduction function is useful for finding a frame wrongly sorted to an existing channel. That is, if a frame belonging to a different channel suddenly appears during reproduction of a moving image, a person can immediately find the frame. In such a case, the person only needs to immediately stop the reproduction, search for the thumbnail image 94 of the corresponding frame in the frame list area C2, and move the thumbnail image 94 to the correct channel with the above-described association operation.

A frame rate area C5 for indicating the frame rate of a selected channel is displayed below the play area C3 on the re-sorting window W4. The frame rate can be calculated by various methods, and can be calculated as a value obtained by, for example, dividing the number of frames belonging to the selected channel by a difference between the time of the first frame belonging to the selected channel and the time of the final frame. Alternatively, the frame rate of the selected channel can also be calculated based on the following formula:

(The frame rate of the moving image corresponding to the active time-line)×(the number of frames belonging to the selected channel)÷(the number of frames belonging to the active time-line)

However, as described above, the frames belonging to the selected channel changes with re-sorting of the frame. Accordingly, each time re-sorting is performed, the re-sorting unit 45 again calculates the frame rate of the selected channel, and changes the display in the frame rate area C5 in real time. Furthermore, a channel name area C6 for indicating the channel name or sort name of a selected channel is arranged in the vicinity of the frame rate area C5. Accordingly, a user can correctly understand to which channel the video picture displayed in the play area C3 belongs, and to which channel the frame rate displayed in the frame rate area C5 belongs.

Hereinafter, a time-line bar C4 will be described. Similar to the time-line bar T5 on the basic screen W1, the time-line bar C4 is an object for schematically showing the active time-line. The target frame group to be subjected to channel separation processing constitutes a part or whole of the active frame group. It is thus important that the active time-line can be managed also on the re-sorting window W4, and thus the time-line bar C4 similar to the time-line bar T5 on the basic screen W1 is arranged. The time-line bar C4 extends in the horizontal direction, and is divided into the number of frames of the active frame group in the horizontal direction. The $n^{-th}$ divided region from the left of the time-line bar C4 corresponds to the $n^{-th}$ frame of the active time-line (n is a natural number).

The re-sorting unit 45 displays, as a mark showing the divided region that corresponds to the active frame of the selected channel on the time-line bar C4, a straight line 83 at the position of the divided region. That is, the straight line 83 shows the position, on the active time-line, of the frame that is displayed in the area C3 and in the enclosing box 96 of the area C2. Furthermore, a target range bar 85 is displayed below the time-line bar C4. Similar to the time-line bar C4, the target range bar 85 extends in the horizontal direction over a range that corresponds to the segment of the target frame group.

Figure 7:
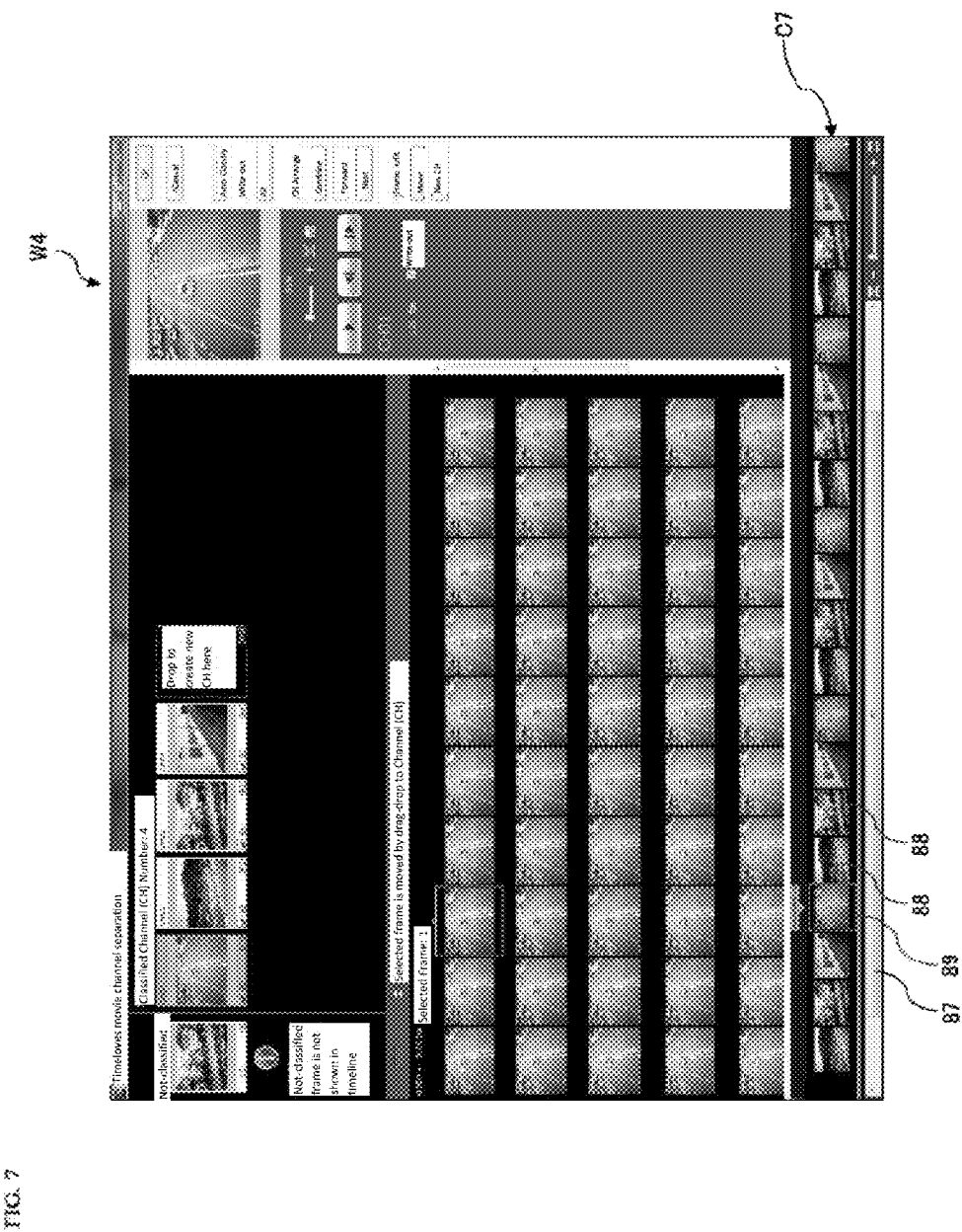
FIG. 7 is another diagram illustrating the re-sorting window.

The time-line bar C4 is extendable in the horizontal direction. Specifically, a scale changing bar 86 is arranged on the re-sorting window W4, and the scale changing bar 86 is an object into which two objects, namely, a slide groove 61 and a slider 62 are combined. The slide groove 61 has a GUI like a groove extending straightly in the horizontal direction, and the slider 62 has a GUI that slides in the slide groove 61 in the horizontal direction. By operating the slider 62 via the input unit 20, the user can reciprocate the slider 62 along the slide groove 61 in the horizontal direction. The re-sorting unit 45 changes the horizontal scale of the time-line bar C4 in a stepwise manner, based on the position of the slider 62 in the slide groove 61 in the horizontal direction. Specifically, the horizontal scale of the time-line bar C4 decreases gradually with the movement of the slider 62 to the right side, and the horizontal scale of the time-line bar C4 increases in a stepwise manner with the movement of the slider 62 to the left side. Note that when the horizontal scale of the time-line bar C4 is changed, the sizes in the horizontal direction of all divided regions are uniformly changed in proportion thereto. Note that, when the slider 62 reaches the leftmost position in the slide groove 61, the time-line bar C4 changes to a thumbnail list C7 (see FIG. 7). Furthermore, if the horizontal scales of the time-line bar C4 and the thumbnail list C7 are too long to be accommodated in the re-sorting window W4, a scroll bar 87 that scrolls in the horizontal direction will appear, and the area for displaying the time-line bar C4 is actually extended in the horizontal direction.

The thumbnail list C7 is a list in which thumbnail images 88 of all of the frames belonging to the active time-line are sequenced in the horizontal direction. Accordingly, the user can also check, on the re-sorting window W4, a frame that is included in the active time-line and does not belong to the target frame group. The $n^{-th}$ thumbnail image 88 from the left on the thumbnail list C7 is the thumbnail image of the $n^{-th}$ frame on the active time-line (n is a natural number). In the thumbnail list C7, an enclosing box 89 is added to the thumbnail image 88 of the active frame of the selected channel, the enclosing box 89 serving as a mark for distinguishing this thumbnail image 88 from the other thumbnail images 88.

Similar to the time-line bar T5, the time-line bar C4 and the thumbnail list C7 accept, from a user, the selection of an arbitrary frame on the active time-line. In other words, the user can select a divided region on the time-line bar C4 or an arbitrary thumbnail image 88 in the thumbnail list C7 with a click operation or the like, so as to select an arbitrary frame from among the active frame group. Also, each time a frame is selected on the time-line bar C4 and the thumbnail list C7, the re-sorting unit 45 determines whether or not the frame is included in the target frame group. If it is determined that the frame is included, the channel or sort to which the frame belongs is switched to the selected channel. At the same time, the re-sorting unit 45 switches the frame to the active frame of the selected channel. Here, the change in the selected channel and the active frame is reflected on the display in the channel list area C1, the frame list area C2, the play area C3, the frame rate area C5, and the channel name area C6 in real time. Furthermore, the positions of the straight line 83 and the enclosing box 89 are also changed in real time.

Using the above-described various functions, the user can perform re-sorting of a plurality of frames included in the target frame group. At the time when it is determined that the re-sorting has ended, an OK button E5 is pressed. In response thereto, the re-sorting unit 45 closes the re-sorting window W4 and newly creates at least one moving image belonging to a new time-line. The at least one moving image that is newly created has a one-to-one correspondence with the channel that was finally defined on the re-sorting window W4 and was selected by the user (hereinafter, referred to as "final channel"). As shown in FIG. 6, the selection of the final channel is made by the user checking a mark in a selection box 98 arranged on the channel object 91. Note that, in the present embodiment, the default value of the selection box 98 is "selected". Accordingly, only with respect to the channel for which it is determined that no moving image creation is needed, the user just needs to operate the selection box on the corresponding object 91 so as to change the state to "non-selected". Furthermore, in the present embodiment, a selection box 99 is also arranged below the play area C3. The selection box 99 is an object for selecting whether or not the moving image of the selected channel (note that the sort "non-sorted" is not included therein) needs to be created, and is synchronized with the selection box 98 on the channel object 91. The re-sorting unit 45 checks the selection states of the selection boxes 98 and 99, and decides the final channel.

A moving image that is newly created in the above-described manner is such that all of the frames belonging to the corresponding final channel are sequenced along the new time-line. Also, at this time, the display window W2 that has a one-to-one correspondence with the new moving image is newly created. Furthermore, the re-sorting unit 45 creates a still image file group that has a one-to-one correspondence with the frame group included in this new moving image, stores the created still image file group in the processed file region 52, and handles it as the 0-order frame. That is, thereafter, the new moving image can be processed similarly to a still image file group loaded in the original image region 51. Specifically, the new moving image can similarly be reproduced in the display window W2, and is similarly to be subjected to various image processing.

Figure 8:
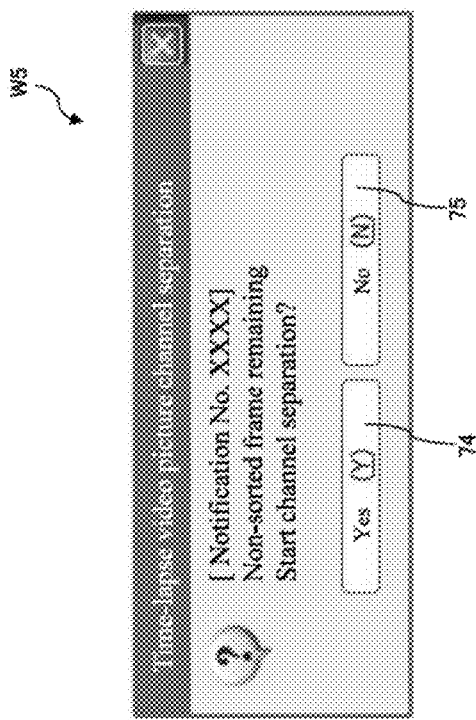
FIG. 8 is a diagram illustrating a check window.

Note that the moving image that corresponds to the sort "non-sorted" is not newly created Accordingly, it is also possible that at the time when the OK button E5 has been pressed, the re-sorting unit 45 determines whether or not there remains a non-sorted frame, and if it is determined that there remains a non-sorted frame, the user is notified of this fact. In this case, if it is determined that there remains a non-sorted frame, the re-sorting unit 45 displays a check window W5 as shown in FIG. 8 on the display 10. When a "Yes" button 74 is pressed, the procedure moves to the above-described processing for newly creating a moving image. When a "No" button 75 is pressed, the check window W5 is closed, and the display returns to the re-sorting window W4. On the other hand, if it is determined that there remains no non-sorted frame, the procedure immediately moves to the above-described processing for newly creating a moving image.

<1-4. Automatic Sorting Algorithm>

Figure 9:
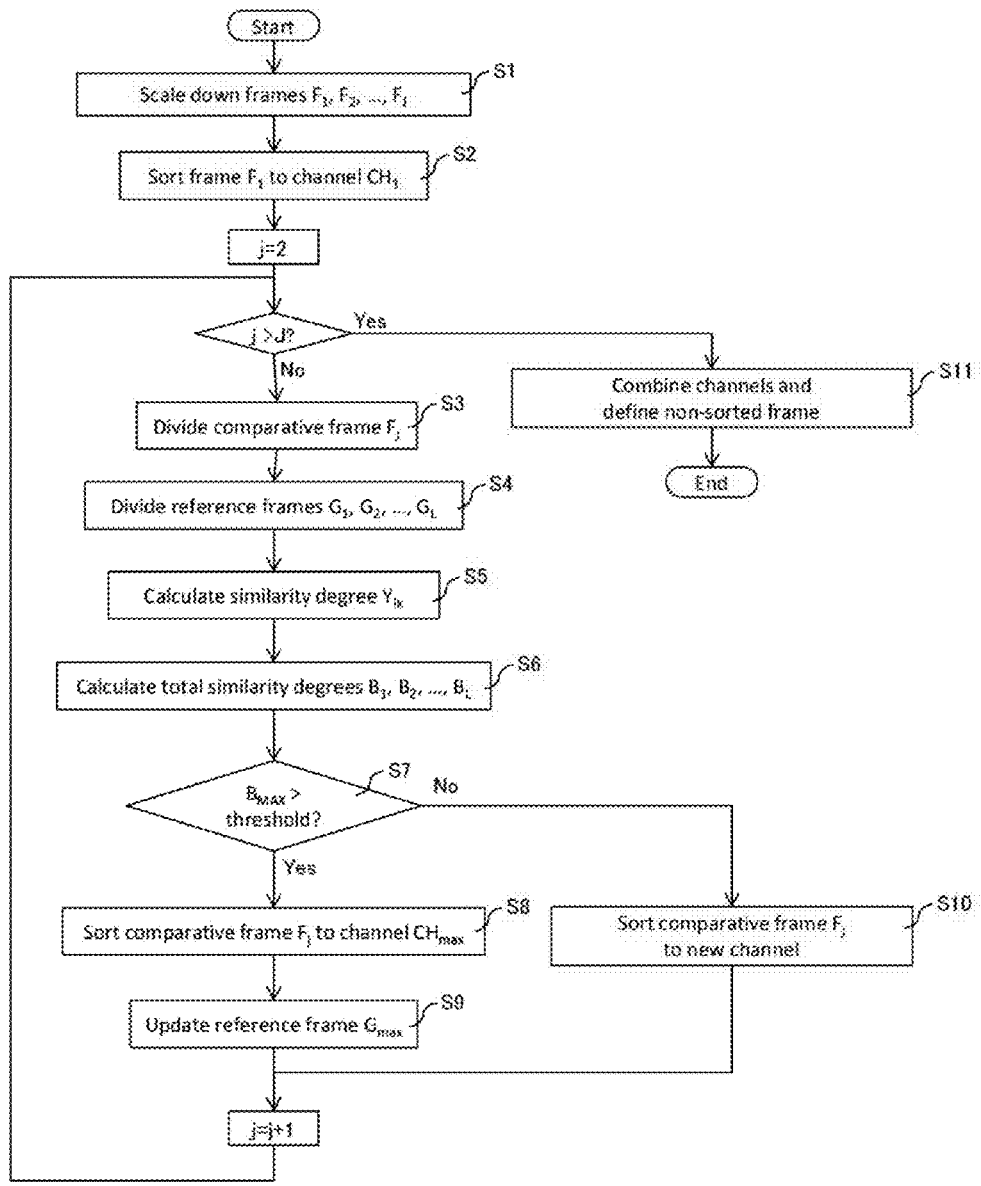
FIG. 9 is a flowchart illustrating a flow of automatic sorting processing according to the first embodiment of the present invention.

Hereinafter, the automatic seating processing will be described in detail with reference to FIG. 9. As described above, the automatic sorting processing starts when the start button 72 on the area setting window W3 has been pressed. In the following, a plurality of frames constituting a target frame group are denoted by $F_1, F_2, \ldots, F_J$ (where J is an integer of 2 or more). Note that the sequence of the frames $F_1, F_2, \ldots, F_J$ is equivalent to the sequence on the time-line.

First, in step S1, the automatic sorting unit 41 scales down the size of the frames $F_1, F_2, \ldots, F_J$ included in a target frame group. At this time, the size of the frames may be scaled down so that the number of the lateral and/or vertical pixels of the frames is a predetermined number, or so that the frames have a size that accounts for a predetermined ratio of the original size. Furthermore, at this time, an aspect ratio may or may not be saved. With this scale down step, the following processing is accelerated, and the influence of noise is reduced. Hereinafter, the scaled-down frames $F_1, F_2, \ldots, F_J$ are also denoted by $F_1, F_2, \ldots, F_J$.

In the following step S2, the setting unit 42 defines a channel $CH_1$, and sorts the frame $F_1$ to the channel $CH_1$. Specifically, the label channel name "$CH_1$" is given to the frame $F_1$. Furthermore, the setting unit 42 sets the frame $F_1$ as a reference frame $G_l$, which represents the frame group that belongs to the channel $CH_1$. Note that by step S10, which will be described later, the number of channels can be increased as needed. Also, for a channel $CH_l$ that is to be newly created a reference frame $G_l$ (I=2, 3, . . . ), which, represents the frame group that belongs to the corresponding channel, will be set.

After the above-described processing has ended, the setting unit 42 sequentially selects, from among the remaining frames $F_2, F_3, \ldots F_J$, a frame $F_j$ (j=2, 3, . . . J) along the time-line, and sets the frame $F_j$ as a comparative frame. Meanwhile, each time a comparative frame $F_j$ is set, the calculation unit 43, the determination unit 44, and the setting unit 42 repeatedly perform following steps S3 to S10 on the comparative frame $F_j$, and perform comparison with the existing reference frames $G_l, G_2, \ldots, G_L$ (L is the number of existing channels).

Figure 10:
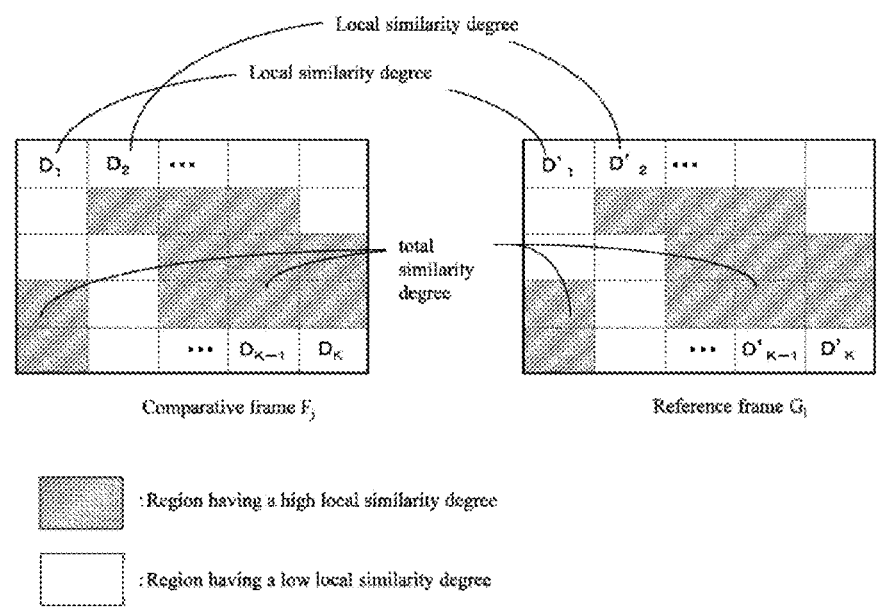
FIG. 10 is a schematic diagram illustrating a method to calculate a similarity degree according to the first embodiment of the present invention.

In step S3, the calculation unit 43 divides the entire comparative frame $F_j$ into a predetermined number K (K is an integer of 2 or more) of sub-regions (blocks) $D_1, D_2, \ldots D_K$ (see FIG. 10). Note that "entire comparative frame $F_j$" in this context refers to, if an area is designated on the area setting window W3, the entire area, whereas, if no designation was made, the entire frame screen. Note that the sub-regions $D_1, D_2, \ldots, D_K$ are not necessarily regions obtained by thoroughly dividing the entire comparative frame $F_j$, and may partially overlap with each other. The shape thereof is not necessarily a rectangle, and may be, for example, a circle or another polygon. Furthermore, the sub-regions may have a uniform shape and size, or different shapes and sizes.

In subsequent step S4, the calculation unit 43 divides each of the reference frames $G_l, G_2, \ldots, G_L$ of the existing channels $CH_1, CH_2, \ldots CH_L$ into sub-regions $D'_1, D'_2, \ldots, D'_K$ (see FIG 10). The sub-regions $D'_1, D'_2, \ldots, D'_K$ are respectively defined so as to be located at the same positions as those of the sub-regions $D_1, D_2, \ldots, D_K$ in the frame screen.

Then, in step S5, the calculation unit 43 calculates, for each combination of the sub-regions $D_k$ and $D'_k$ (k=1, 2, . . . , K), a similarity degree $Y_{lk}$ (hereinafter, referred to as "local similarity degree") between the comparative frame $F_j$ and each reference frame $G_l$ (l=1, 2, . . . , L). That is, the local similarity degree $Y_{lk}$ refers to the similarity degree between the sub-region $D_k$ of the comparative frame $F_j$ and the sub-region $D'_k$ of the reference frame $G_l$. In the present embodiment, a correlation coefficient that is called "zero-mean normalized cross correlation" (ZNCC) is calculated, but in another embodiment, another similarity degree such as a correlation coefficient that is called "NCC", or a similarity degree that is called "SDD" or "SAD" may be calculated.

Then, in step S6, the calculation unit 43 calculates a frame-overall similarity degree $B_l$ (hereinafter, referred to as "total similarity degree") between the comparative frame $F_j$ and the corresponding reference frame $G_l$ (l=1, 2, . . . , L). Specifically, the calculation unit 43 determines, for each l (l=1, 2, . . . , L), the sub-regions $D_k$ and $D'_k$ that have a high local similarity degree $Y_{lk}$. At this time, for example, the local similarity degree $Y_{lk}$ may be determined as high if it is within a predetermined high order range, or may be determined as high if it is larger than a predetermined threshold. Then, the calculation unit 43 again calculates, for each l (l=1, 2, ..., L), the similarity degree between the comparative frame $F_j$ and the reference frame $G_l$ only using the sub-regions $D_k$ and $D'_k$ that have a high local similarity degree $Y_{lk}$ in the entire frame, and sets the calculated similarity degree as the total similarity degree $B_1$ (see FIG. 10). In the present embodiment, a zero-mean normalized cross correlation (ZNCC) is also calculated as the total similarity degree $B_1$, but another similarity degree may be calculated, similar to the case of the local similarity degree $Y_{lk}$. Furthermore, the total similarity degree $B_1$ and the local similarity degree $Y_{lk}$ may be calculated using different methods.

Accordingly, in the present embodiment, the information relating to the sub-regions $D_k$ and $D'_k$ that have a low local similarity degree $Y_{lk}$ is not taken into consideration for the calculation of the total similarity degree $B_1$, and the reason thereof is as follows. That is, frames belonging to the same channel have the same background image except for a moving subject part. If the moving subject part accounts for a large ratio in the entire frame, and the total similarity degree $B_1$ is determined using the information relating to the entire frame, even frames belonging to the same channel will have a low total similarity degree $B_1$. Accordingly, here, the sub-regions $D_k$ and $D'_k$ that are considered to include a large moving subject part and have a low local similarity degree $Y_{lk}$ are not used in the calculation of the total similarity degree $B_1$, in order to prevent erroneous determination. As a result, the influence of a moving subject is reduced, and it is possible to correctly determine whether or not compared frames belong to the same channel.

In subsequent step S7, the determination unit 44 determines the maximum of the total similarity degrees $B_1$, $B_2$, ..., $B_L$ calculated in step S6, and determines whether or not the maximum total similarity degree is larger than a predetermined threshold. If it is determined that the maximum total similarity degree is larger than the predetermined threshold, the procedure advances to step S8, whereas if it is determined that the maximum total similarity degree is the predetermined threshold or less, the procedure advances to step S10.

In step S8, the determination unit 44 determines that the comparative frame $F_j$ belongs to a channel $CH_{MAX}$. "MAX" is a value of "l" of the maximum total similarity degree $B_1$. Specifically, the determination unit 44 gives the channel name label "$CH_{MAX}$" to the comparative frame $F_j$, and sorts the comparative frame $F_j$ to the channel $CH_{MAX}$. Accordingly, the comparative frame $F_j$ will belong to the same channel as that of the frame group belonging to the channel $CH_{MAX}$.

After step S8, the procedure advances to step S9. In step S9, the setting unit 42 updates a reference frame $G_{MAX}$ of the channel $CH_{MAX}$. Specifically, the setting unit 42 combines the comparative frame $F_j$ with the existing reference frame $G_{MAX}$ into a new reference frame $G_{MAX}$. In the present embodiment, weighted averaging is employed as a combination method, in which a larger weight is given to the comparative frame $F_j$ than the existing reference frame $G_{MAX}$. Accordingly the reference frame $G_{MAX}$ that represents the frame group belonging to the channel $CH_{MAX}$ is a combined image in which, a larger weight is given to a nearer frame. As a result, when determining whether or not frames belong to different channels, it is possible to support a time-series change. Note that in other embodiments, the comparative frame $F_j$ may directly be set as a new reference frame $G_{MAX}$. Alternatively, step S9 may be omitted so that an update of the reference frame $G_{MAX}$ is not performed.

On the other hand, step S10 is a step that is executed when all of the total similarity degrees $B_1$, $B_2$, ... $B_L$ calculated in step S6 are determined as being a predetermined threshold or less. In other words, step S10 is a step that is executed when the comparative frame $F_j$ is not similar to the reference frame $G_l$ of any of the channels $CH_1$. In step S10, the setting unit 42 defines a new channel $CH_{L+1}$, in addition to the existing channels $CH_1$, $CH_2$, ..., $CH_L$, and sorts the comparative frame $F_j$ to the channel $CH_{L+1}$. Specifically, a new channel name label "$CH_{L+1}$" is given to the comparative frame $F_j$. Furthermore, the setting unit 42 sets the comparative frame $F_j$ as a reference frame $G_{L+1}$, which represents the frame group belonging to the new channel $CH_{L+1}$.

When steps S3 to S10 on all of the frames $F_1$, $F_2$, ... $F_J$ have ended, the procedure advances to step S11. In step S11, the existing channels $CH_1$, $CH_2$, ..., $CH_L$ are corrected. Specifically, the calculation unit 43 calculates the frame-overall similarity degree between the reference frames $G_1$, $G_2$, ..., $G_L$ in an all-to-all manner. Note that, similar to step S3, "frame-overall" in this context refers to, if an area is designated on the area setting window W3, the entire area, whereas, if no designation was made, the entire frame screen. Furthermore, in the present embodiment, a zero-mean normalized cross correlation (ZNCC) is calculated as the similarity degree but another similarity degree may be calculated, similar to steps S5 and S6. Furthermore, the similarity degree may be calculated by a method different from methods by which the total similarity degree $B_1$ and the local similarity degree $Y_{lk}$ are calculated. Also, if such a similarity degree exceeds a predetermined threshold, the determination unit 44 combines the channels $CH_1$ that correspond to the reference frames $G_l$ that give such a similarity degree into one channel. Specifically, the same channel name label is again given to all of the frames $F_j$ belonging to the channels $CH_1$ to be combined. Note here that three or more channels $CH_1$ may be combined into one.

Furthermore, if there is a channel $CH_1$ that includes only one frame even after the above-described combination of channels, the determination unit 44 deletes the channel $CH_1$. Specifically, the determination unit 44 again gives the label "non-sorted" to all of the frames $F_j$ belonging to the channel $CH_1$ to be deleted. Note that, in the present embodiment, the channel $CH_1$ that includes only one frame $F_j$ is to be deleted, but such a reference value may be two, three, or the like. Furthermore, it is also possible to set an upper limit for the number of channels that can be created. In this case, deletion can be started from the channel that includes the smallest number of frames $F_j$, so that the number of channels does not exceed the upper limit.

According to the above-described processing, it is likely that the values included in the channel names $CH_1$ of the finally created channels are not a consecutive number. Accordingly, the determination unit 44 again gives the channel names such as $CH_{01}$, $CH_{02}$, and the like sequentially to the finally created channels $CH_1$, and updates the labels given to the frames $F_j$ to these new channel names. Then, the automatic sorting processing ends.

<2. Second Embodiment>

Figure 11:
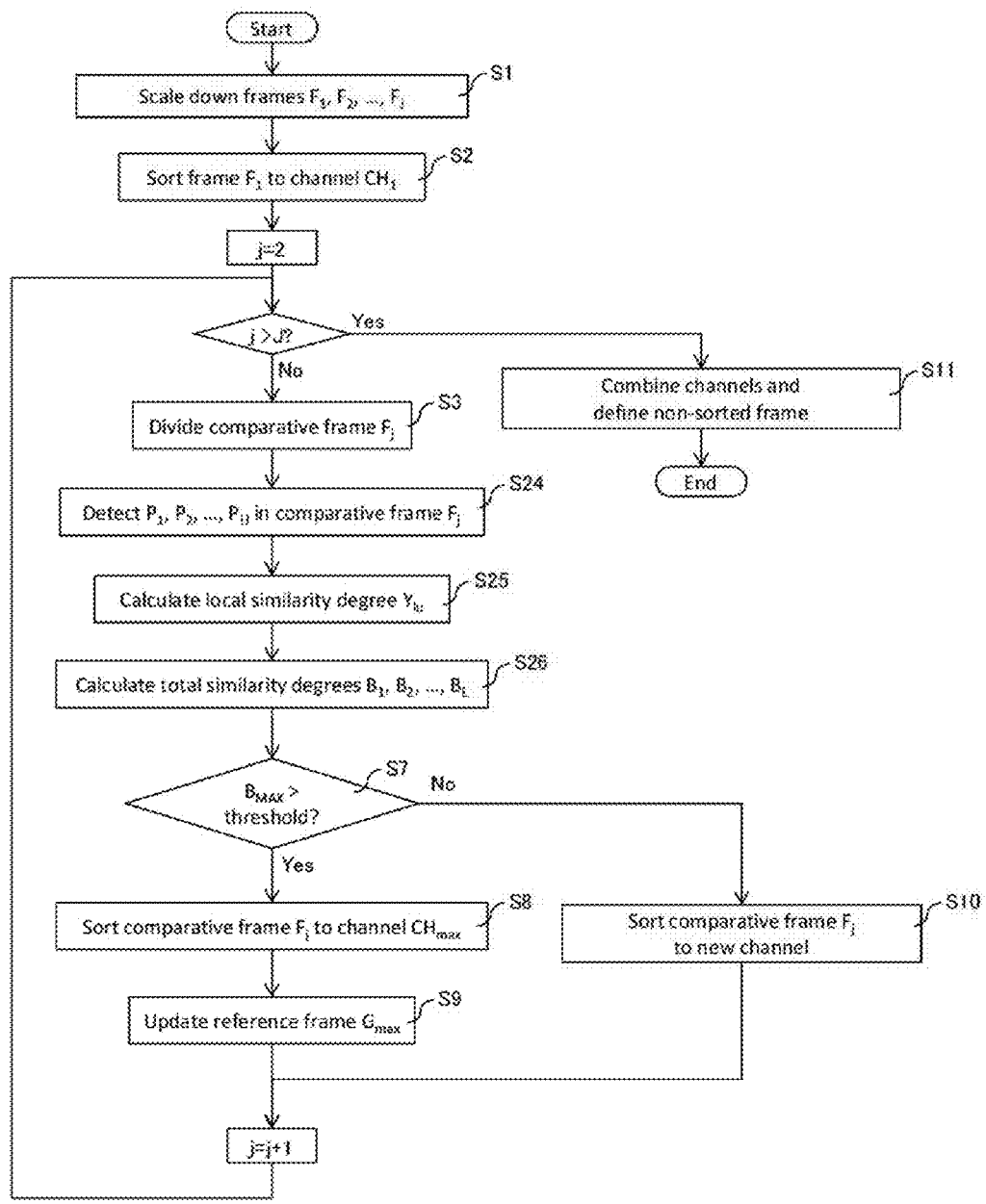
FIG. 11 is a flowchart illustrating a flow of automatic sorting processing according to a second embodiment of the present invention.

Hereinafter, a second embodiment of the present invention will be described. FIG. 11 shows a flow of automatic sorting processing according to the second embodiment, and the second embodiment differs from the first embodiment in an automatic sorting algorithm. Furthermore, as is clear from the comparison between FIG. 9 and FIG. 11, a difference between both of the automatic sorting processes is that, instead of steps S4 to S6, steps S24 to S26 are inserted in the second embodiment. Accordingly, in the following, for case of description, only the difference will be described.

In the second embodiment, after execution of steps S1 to S3 as with the first embodiment, step S24 is executed. In step S24, the calculation unit 43 detects feature points in each of the sub-regions $D_1, D_2, \ldots, D_K$ of the comparative frame $F_j$. At that time, the numbers of the feature points that are detected in the respective sub-regions $D_1, D_2, \ldots, D_K$ are preferably the same. Hereinafter, the feature points of the comparative frame $F_j$ are denoted as $P_1, P_2, \ldots, P_U$ (U is an integer of 2 or more).

Figure 12:
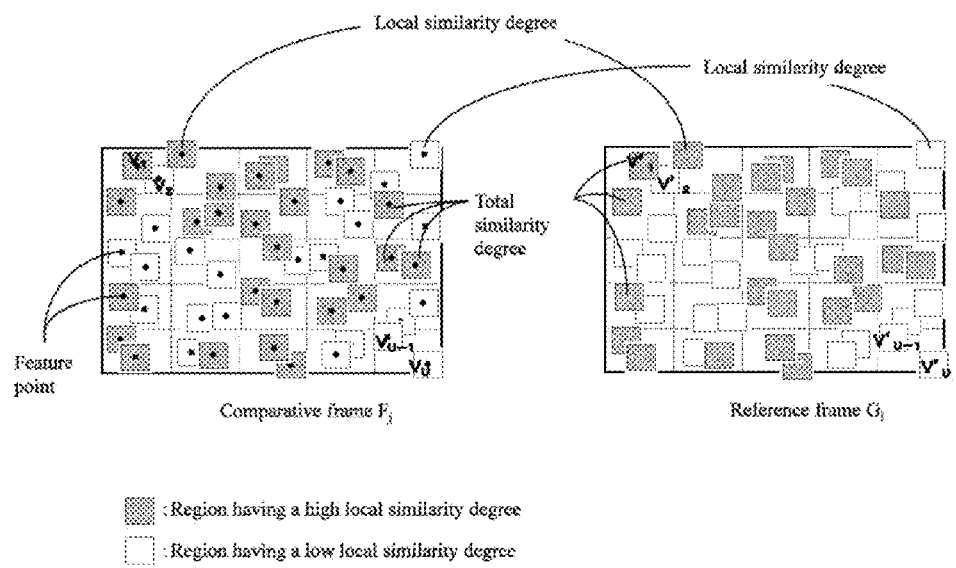
FIG. 12 is a schematic diagram illustrating a method to calculate a similarity degree according to the second embodiment of the present invention.

The calculation unit 43 sets, in the comparative frame $F_j$, a sub-region $V_u$ in the vicinity of each feature point $P_u$ (u=1, 2, ..., U) (see FIG. 12). The sub-region $V_u$ is a region of a predetermined size in which the feature point $P_u$ is located at the center. Then, the calculation unit 43 sets sub-regions $V'_1, V'_2, \ldots, V'_U$ for each of the reference frames $G_1, G_2, \ldots, G_L$ of the existing channels $CH_1, CH_2, \ldots, CH_L$ (see FIG. 12). The sub-regions $V'_1, V'_2, \ldots, V'_U$ are respectively defined so as to be located at the same positions as those of the sub-regions $V_1, V_2, \ldots, V_U$ in the frame screen.

As described above, in the present embodiment the feature points $P_1, P_2, \ldots, P_U$ are detected from the comparative frame $F_j$ on a basis of the sub-regions $D_1, D_2, \ldots, D_K$. As a result, the feature points $P_1, P_2, \ldots, P_U$ are detected substantially uniformly from the entire comparative frame $F_j$ without being biased to a partial region of the entire screen of the comparative frame $F_j$.

Then, in step S25, the calculation unit 43 calculates, for each combination of sub-regions $V_u$ and $V'_u$ (u=1, 2, ..., L), the local similarity degree $Y_{lu}$ between the comparative frame $F_j$ and each reference frame $G_l$ (l=1, 2, ..., L). That is, "local similarity degree $Y_{lu}$" refers to the similarity degree between the sub-region $V_u$ of the comparative frame $F_j$ and the sub-region $V'_u$ of the reference frame $G_l$. Note that the local similarity degrees in the first and second embodiments are common in that they denote the similarity degrees between sub-regions, and thus the same reference sign Y is used to denote the local similarity degrees. Furthermore, in the present embodiment, a correlation coefficient, called a zero-mean normalized cross correlation (ZNCC), is calculated, but another similarity degree may be calculated, similar to the first embodiment.

Then, in step S26, the calculation unit 43 calculates the frame-overall total similarity degree $B_1$ between the comparative frame $F_j$ and the corresponding reference frame $G_l$ (l=1, 2, ..., L). Note that the total similarity degrees in the first and second embodiments are common in that they denote the similarity degrees in the entire frame, and thus the same reference sign B is used for denoting the total similarity degrees. Specifically, the calculation unit 43 determines, for each l (l=1, 2, ..., L), the sub-regions $V_u$ and $V'_u$ that have a high local similarity degree $Y_{lu}$. At this time, for example, the local similarity degree may be determined as high if the local similarity degree $Y_{lu}$ is in a predetermined high order range, or may be determined as high if the local similarity degree $Y_{lu}$ is larger than a predetermined threshold. Then, for each l (l=1, 2, ..., L), the similarity degree between the comparative frame $F_j$ and the reference frame $G_l$ is again calculated only using the sub-regions $V_u$ and $V'_u$ of the entire frame that have a high local similarity degree $Y_{lu}$, and the calculated similarity degree is set as the total similarity degree $B_1$. Also in the present embodiment, a zero-mean normalized cross correlation (ZNCC) is calculated as the total similarity degree $B_1$, but another similarity degree may be calculated similar to the first embodiment. Also in the present embodiment, the total similarity degree $B_1$ and the local similarity degree may be calculated by different methods.

With step S26 above, the total similarity degrees $B_1, B_2, \ldots, B_L$ are calculated. The flow of the processing thereafter is the same as in the first embodiment.

As described above, in the present embodiment, information relating to regions other than the sub-regions $V_1, V_2, \ldots V_U$ in the vicinity of the feature points $P_1, P_2, \ldots P_U$ is not taken into consideration for the calculation of the total similarity degrees. This is because, if frames, even of different channels, are of images obtained by capturing similar scenes, and information relating to the entire frame is used for determining the total similarity degree $B_1$, a high total similarity degree $B_1$ will be obtained. For example, in a case of two video pictures in which different places of the same shop interior are captured, the major part of the frame of both video pictures may include wallpaper, a floor, and the like in the same uniform color, and in such a case, the total similarity degree $B_1$ is high. Accordingly, here, the regions in which a background such as wallpaper and a floor in the same uniform color is likely to be captured, that is, the regions that are not located in the vicinity of the feature points $P_1, P_2, \ldots, P_U$ are not used in the calculation of the total similarity degree $B_1$, in order to prevent erroneous determination. As a result, it is possible to reduce the influence of a similar background, and to correctly determine whether or not compared frames belong to the same channel.

Furthermore, in the present embodiment, information relating to the sub-regions $V_{lu}$ and $V'_u$ that have a low local similarity degree $Y_{lu}$ is also not taken into consideration for the calculation of the total similarity degree $B_1$. This is because, if information relating to the entire frame is used to determine the total similarity degree $B_1$ when the ratio of a moving subject part in the entire frame is large, frames, even of the same channel, will have a low total similarity degree $B_1$. Accordingly, here, the sub-regions $V_u$ and $V'_u$ that have a low local similarity degree $Y_{lu}$ and that are considered to include a large moving subject part are not used for the calculation of the total similarity degree $B_1$, in order to prevent erroneous determination. As a result, it is possible to reduce the influence of the moving subject, and to more correctly determine whether or not compared frames belong to the same channel.

<3. Third Embodiment>

Figure 13:
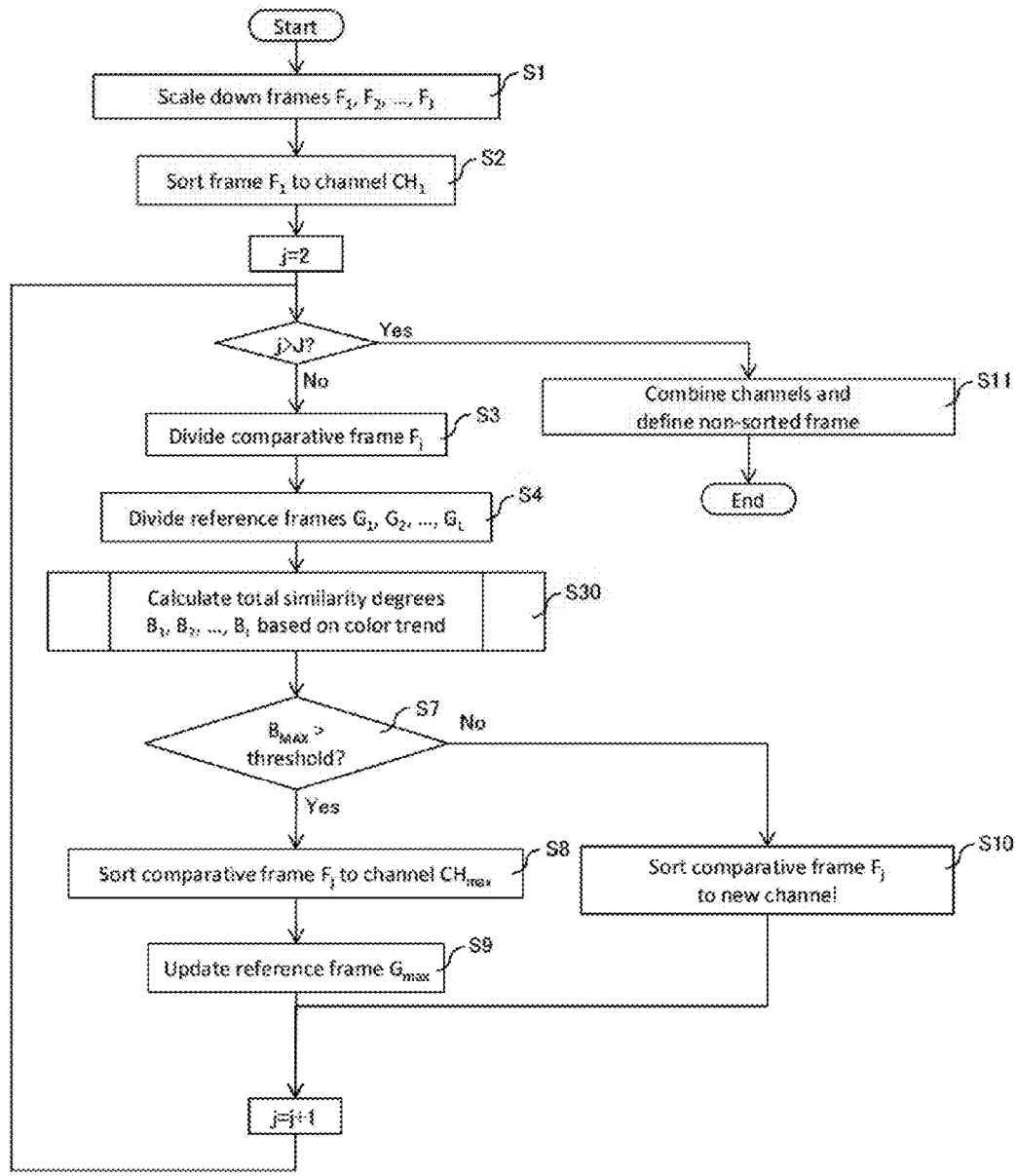
FIG. 13 is a flowchart illustrating a flow of automatic sorting processing according to a third embodiment of the present invention.

Hereinafter, a third embodiment according to the present invention will be described. FIG. 13 shows a flow of automatic sorting processing according to the third embodiment and the third embodiment differs from the first and second embodiments only in an automatic sorting algorithm. Furthermore, as is clear from the comparison between FIG. 13 and FIG. 9, a difference between automatic sorting processes according to the first and third embodiments is only that, instead of steps S5 and S6, sub routine S30 is inserted in the third embodiment. Accordingly, in the following, for case of description, only the difference will be described.

As described above, in the first and second embodiments, a correlation coefficient is calculated, as a similarity degree between frames, but in the third embodiment, the similarity degree between frames is evaluated based on color trends of the frames. Furthermore, as the color trend of a frame, an overall color trend in the screen of the frame and a local color trend in the screen of the frame are comprehensively taken into consideration. In the following, a specific description will be given.

First, in the third embodiment, steps S1 to S4 as with the first embodiment are executed, and then sub routine S30 is executed. Sub routine S30 is processing for evaluating various color indexes indicating local or overall color trends in the frame screen, and is shown in detail in FIG. 17. Particularly, density is considered in steps S31 to S33 included in sub routine S30, chroma is considered in steps S34 to S38, and hue is considered in steps S39 to S43. Note that although density is considered in steps S31 to S33, intensity or brightness may be used instead of density. Furthermore, frame-overall impression is considered in steps S44 to 46 included in sub routine S30.

Figure 14:
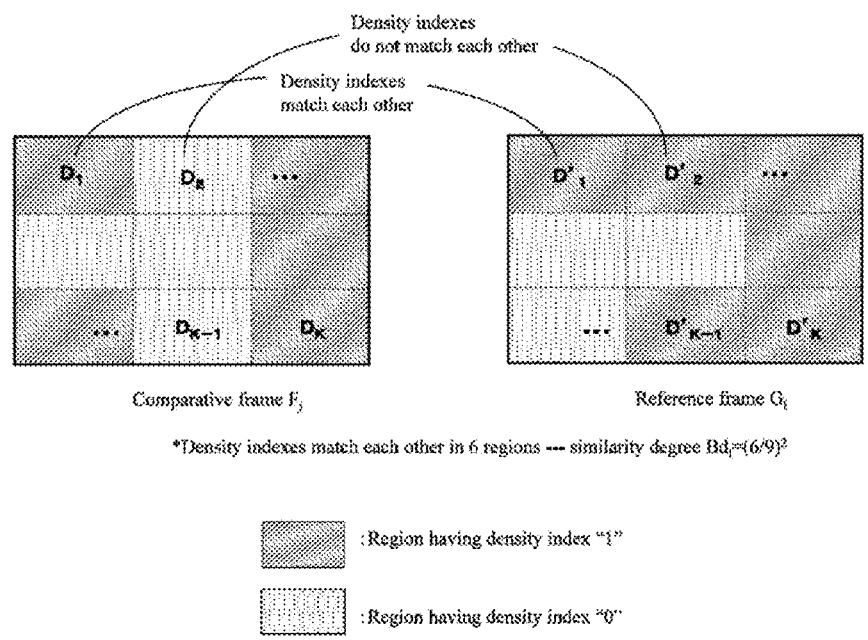
FIG. 14 is a schematic diagram illustrating a method to calculate a similarity degree according to the third embodiment of the present invention.

First, in step S31, the calculation unit 43 calculates an average density Hd of the entire comparative frame $F_j$. Note that "entire comparative frame $F_j$" in this context refers to, if an area is designated on the area setting window W3, the entire area, whereas, if no designation was made, the entire frame screen. Furthermore, the calculation unit 43 calculates an average density $Ed_k$ of each sub-region $D_k$ (k=1, 2, ..., K) of the comparative frame $F_j$. Note that "average density" is calculated as an average of the densities of all pixels in the target area, and the density of each pixel is calculated as an average of RGB values of the pixel. Then, the calculation unit 43 gives the value "1" to each sub-region $D_k$ (k=1, 2, ..., K) if density $Ed_k$>density Hd is satisfied, and gives the value "0" if density $Ed_k$≤density Hd is satisfied (see FIG 14). Note that the values "1" and "0" are indexes that indicate whether the density of a local region is relatively high or low relative to the entire frame, and are color indexes that indicate the local color trend regarding density (brightness) (hereinafter, referred to as "density index").

Figure 17:
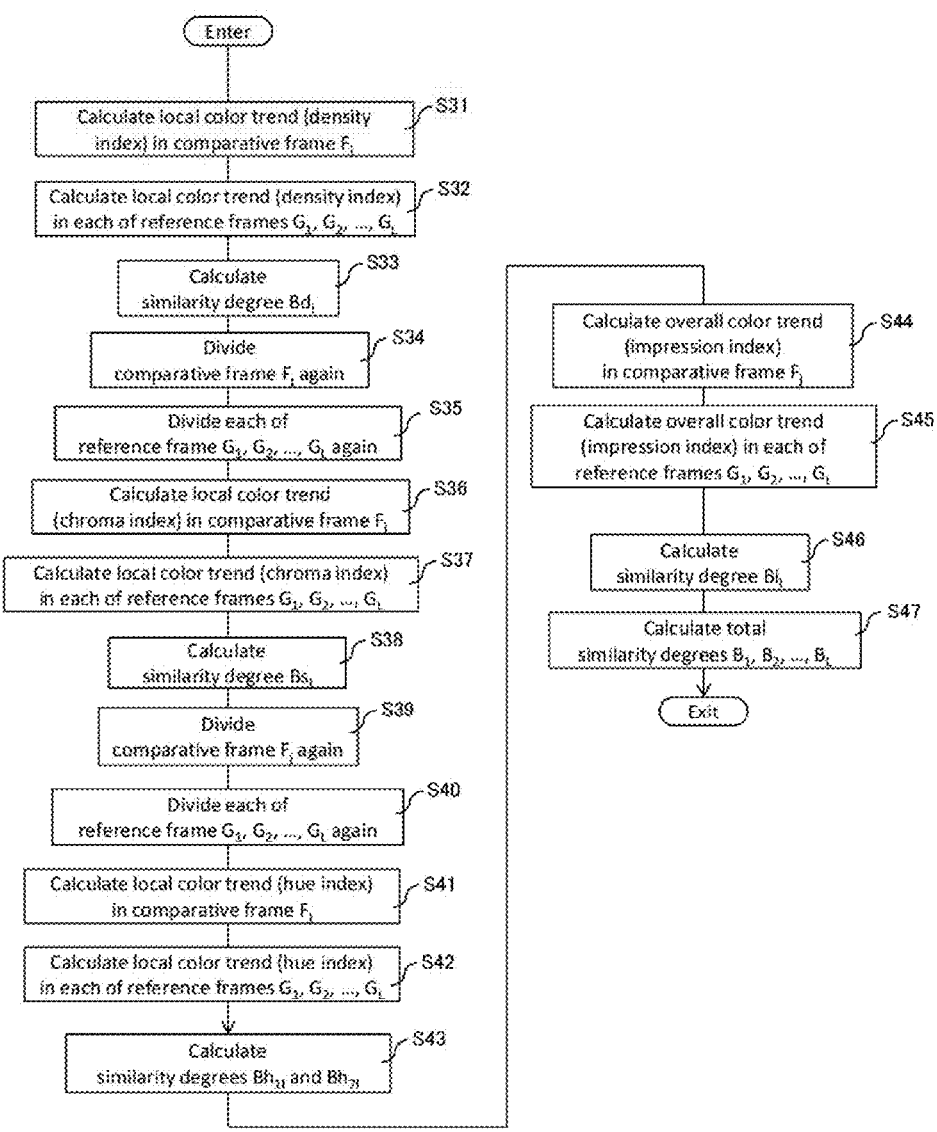
FIG. 17 is a flowchart illustrating a flow of processing for evaluating a color trend according to the third embodiment of the present invention.

In subsequent step S32, the calculation unit 43 executes the same processing as step S31 on each of the reference frames $G_1$, $G_2$, ..., $G_L$ of the existing channels $CH_1$, $CH_2$, $CH_L$. That is, the calculation unit 43 calculates, for each l (l=1, 2, ..., L), a density index with respect to each sub-region $D'_k$ (k=1, 2, ..., K) in the reference frame $G_l$ (see FIG. 14). Note that, as shown in FIG. 13 and FIG. 17, step S32 will be repeatedly executed, and thus, for the reference frame $G_l$ for which the density index has been calculated, this value is referenced and new calculation processing is omitted.

In subsequent step S33, the calculation unit 43 calculates, based on the density indexes calculated in steps S31 and S32, a similarity degree $Bd_1$ between the comparative frame $F_j$ and each reference frame $G_l$ (l=1, 2, ..., L). Specifically, the calculation unit 43 calculates, as the similarity degree $Bd_1$, a similarity degree between a density index distribution pattern in the comparative frame $F_j$ and a density index distribution pattern of each reference frame $G_l$. In the present embodiment, the number of combinations of the sub-regions $D_k$ and $D'_k$ whose density indexes "1" and "0" do not match is counted, and the square value of the value obtained by dividing tins count value by a sub-region count K is set as the similarity degree $Bd_1$ (see FIG. 14). Note here that the reason why division using the sub-region count K is performed is to maintain the similarity degree $Bd_1$ as a value between 0 and 1, and to normalize it. Furthermore, the smaller the similarity degrees calculated in steps S33, and steps S38 and S43, which will be described later, the higher the similarity is. In this sense, these similarity degrees can be handled as "non-similarity degrees".

Meanwhile, a composition of an image is decided by arrangement of a plurality of elements in the screen. Many images, if simplified, have a composition in which a region showing an attention object and a region showing the background thereof are broadly separated. That is, the region having the density index "1" and the region having the density index "0" can be considered such that one shows an attention object and the other shows the background thereof. Based on this consideration, it can be said that the density index distribution pattern in the comparative frame $F_j$ refers to the composition of the comparative frame $F_j$, and the density index distribution pattern in the reference flame $G_l$ refers to the composition of the reference frame $G_l$. Accordingly, it can be said that the similarity degree $Bd_1$ refers to the similarity degree of the composition between the comparative frame $F_j$ and the reference fame $G_l$.

In subsequent step S34, the calculation unit 43 divides, based on the density index distribution pattern in the comparative frame $F_j$, the comparative frame $F_j$ into two sub-regions $R_1$ and $R_2$ (see FIG. 15). The sub-regions $R_1$ are regions obtained by combining all of the sub-regions $D_k$ whose density index is "1" in the comparative frame $F_j$, and the sub-regions $R_2$ are regions obtained by combining all of the sub-regions $D_k$ whose density index is "0" in the comparative frame $F_j$. That is, in step S34, the comparative frame $F_j$ is divided into the region showing the attention object and the region showing the background thereof, based on the composition of the comparative frame $F_j$.

In subsequent step S35, similar to step S34, the calculation unit 43 divides, based on the density index distribution pattern of each of the reference frame $G_1$, $G_2$, ..., $G_L$ of the existing channels $CH_1$, $CH_2$, ..., $CH_L$, each of the reference frame $G_1$, $G_2$, ..., $G_L$ into sub-regions $R'_1$ and $R'_2$ (see FIG. 15). The sub-region $R'_1$ is a region obtained by combining all of the sub-regions $D'_k$ whose density index is "1" in the reference frame $G_l$, and the sub-region $R'_2$ is a region obtained by combining all of the sub-regions $D'_k$ whose density index is "0" in the reference frame $G_l$. That is, in step S35, the reference frame $G_l$ is divided into the region showing an attention object and the region showing the background thereof based on the composition of the reference frame $G_l$.

In subsequent step S36, the calculation unit 43 calculates, for each of the sub-regions $R_1$ and $R_2$ in the comparative frame $F_j$, three averages for each of RGB. Then, the calculation unit 43 calculates a chroma of the sub-region $R_1$ based on the thee averages for each of RGB in the sub-region $R_1$, and calculates a chroma of the sub-region $R_2$ based on the three averages for each of RGB in the sub-region $R_2$. Then, the calculation unit 43 calculates a chroma that is relative between the sub-regions $R_1$ and $R_2$ (hereinafter, referred to as relative chroma). The relative chroma is calculated as the absolute value of a difference in chroma between the sub-region $R_1$ and the sub-region $R_2$. The relative chroma is a color index indicating the color trend regarding chroma (hereinafter, referred to as chroma index).

In subsequent step S37, the calculation unit 43 executes the same processing as step S36 on each of the reference frames $G_1$, $G_2$, ... $G_L$ of the existing channels $CH_1$, $CH_2$, ..., $CH_L$. That is, the calculation unit 43 calculates, for each l (l=1, 2, ..., L), a chroma of each of the sub-regions $R'_1$ and $R'_2$ in the reference frame $G_l$, and calculates the relative chroma, which is the absolute value of a difference between these. Note that, as shown in FIG. 13 and FIG. 17, step S37 will be repeatedly executed, and thus, for the reference frame $G_l$ for which the relative chroma has been calculated, this value is referenced and new calculation processing is omitted. Step S35 may also be omitted similarly.

Figure 16:
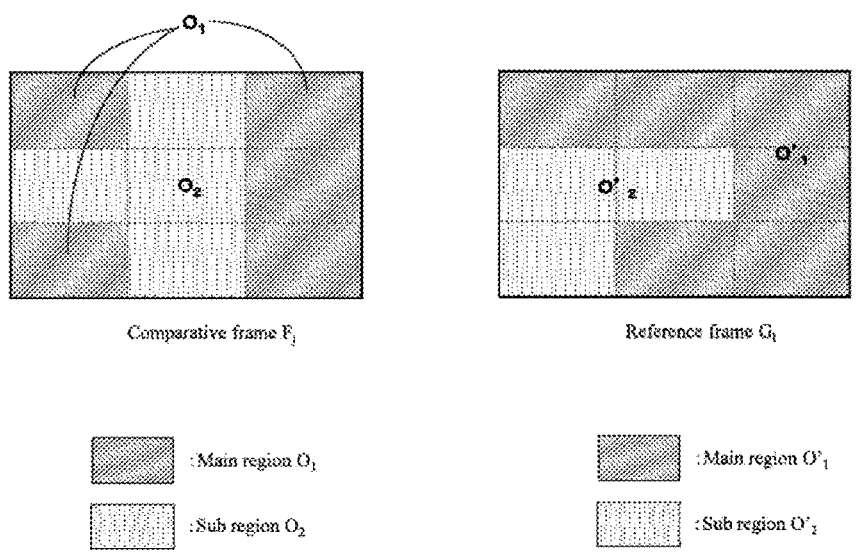
FIG. 16 is a schematic diagram illustrating yet another method to calculate a similarity degree according to the third embodiment of the present invention.

In subsequent step S38, the calculation unit 43 calculates a similarity degree $Bs_1$ between the relative chroma of the comparative frame $F_j$ and the relative chroma of each reference frame $G_l$ (l=1, 2, ..., L), which were calculated in steps S36 and S37. In the present embodiment. The similarity degree $Bs_1$ is calculated as the square value of the value obtained by dividing a difference between both relative chromas by 255. Note here that the reason why division using 255 is performed is to maintain the similarity degree $Bs_1$ between 0 and 1, and to normalize it In subsequent step S39, the calculation unit 43 divides the comparative frame $F_j$ into two regions, namely, a main region $O_1$ and a sub region $O_2$. Specifically, of the sub-regions $R_1$ and $R_2$ calculated in step S34, the region having a larger area is set as the main region $O_1$, and the region having a smaller area is set as the sub region $O_2$ (see FIG. 16). That is, in step S39, the comparative frame $F_j$ is divided into the region showing an attention object and the region showing the background thereof, based on the composition of the comparative frame $F_j$.

In subsequent step S40, similar to step S39, the calculation unit 43 divides each of the reference frames $G_l$, $G_2$, ..., $G_L$ into two regions, namely, a main region $O'_1$ and a sub region $O'_2$. Specifically, of the sub-regions $R'_1$ and RS calculated in step S35, the region having a larger area is set as the main region $O'_1$, and the region having a smaller area is set as the sub region $O'_2$ (see FIG. 16). That is, in step S40, the reference frame $G_l$ is divided into the region showing an attention object and the region showing the background thereof, based on the composition of the reference frame $G_j$.

In subsequent step S41, the calculation unit 43 calculates an average hue of the main region $O_1$, and calculates an average hue of the sub region $O_2$. Note that these average hues are each color index indicating a local color trend regarding hue (hereinafter, referred to as "hue index"), and ate each calculated as an average of hues of all pixels in the target area.

In subsequent step S42, the calculation unit 43 executes the same processing as step S41 on each of the reference frames $G_l$, $G_2$, ..., GL of the existing channels $CH_1$, $CH_2$, ..., $CH_L$. That is, the calculation unit 43 calculates, for each l (l=1, 2, ..., L), a hue index of each of the regions $O'_1$ and $O'_2$ in the reference frame $G_l$. Note that, as shown in FIG. 13 and FIG. 17, step S42 will be repeatedly executed, and thus, for the reference frame $G_l$ for which the hue index has been calculated, this value is referenced and new calculation processing is omitted. Step S40 may also be omitted similarly.

In subsequent step S43, the calculation unit 43 calculates a similarity degree $Bh_u$ between the hue index of the main region $O_1$ in the comparative frame $F_j$, and the hue index of the main region $O'_1$ in each reference frame $G_l$ (l=1, 2, ..., L). In the present embodiment, the similarity degree $Bh_u$ is calculated as the square value of the value obtained by dividing the difference between the hue indexes of the main regions $O_1$ and $O'_1$ by 180. Furthermore, the calculation unit 43 calculates a similarity degree $Bh_{21}$ between the hue index of the sub region $O_2$ in the comparative frame $F_j$, and the hue index of the sub region $O'_2$ in each reference frame $G_l$ (l=1, 2, ..., L). Specifically, the square value of the value obtained by dividing the difference between the hue indexes of the sub regions $O_2$ and $O'_2$ by 180 is set as the similarity degree $Bh_{21}$. Note here that the reason why division using 180 is performed is to maintain the similarity degrees $Bh_{11}$ and $Bh_{21}$ between 0 and 1, and to normalize them.

Subsequent steps S44 to S46 are steps for evaluating a color index indicating an overall color trend in the frame screen. In the present embodiment, various impressions $Z_1$, $Z_2$, ..., $Z_I$ (I is an integer of 2 or more) are defined in order to evaluate the overall color trend in the frame screen. Note that various types of information for defining these impressions $Z_1$, $Z_2$, ..., $Z_I$ are stored in the impression defining region 53 of the software management region 50.

Figure 18:
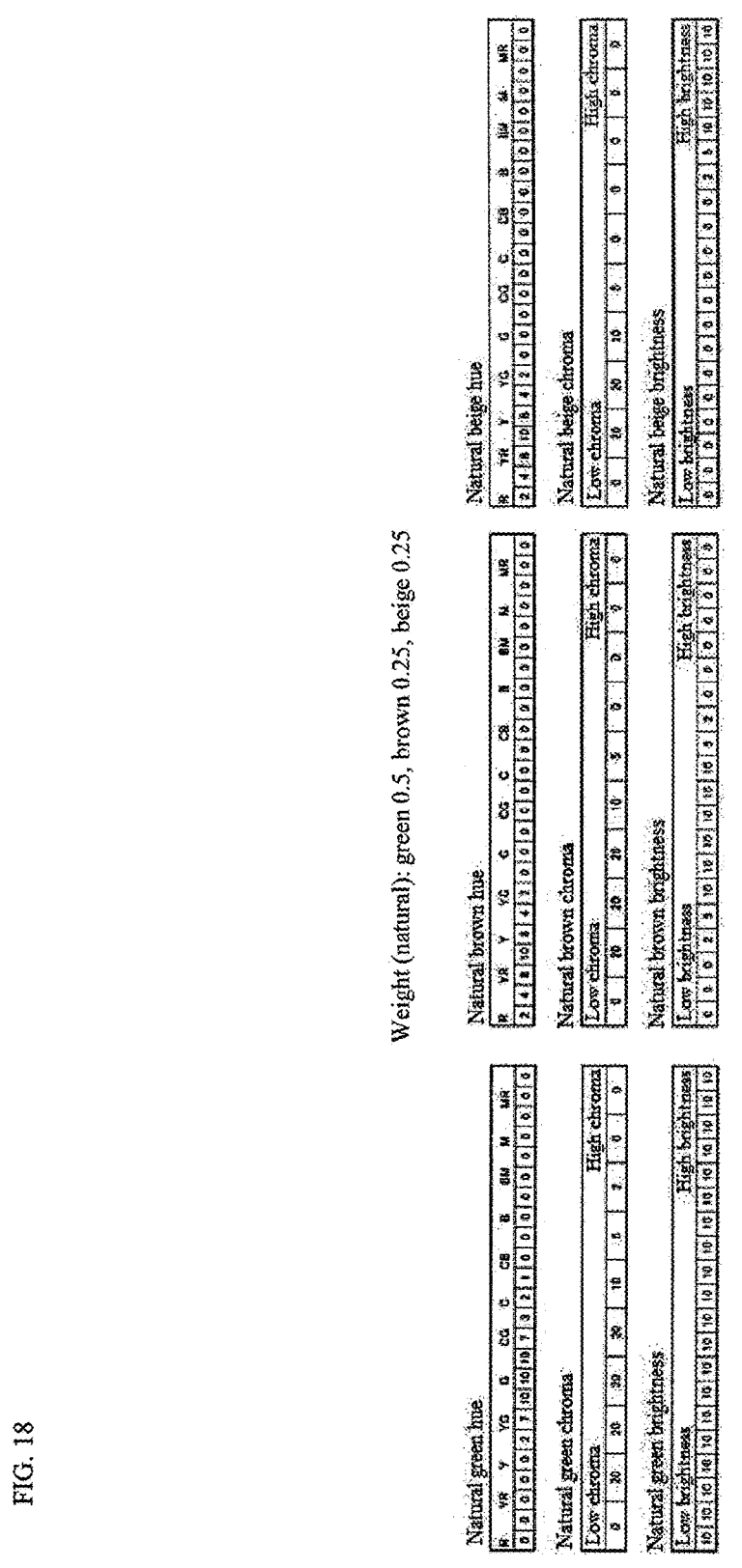

Hereinafter, the impression $Z_i$ (i=1, 2, ..., I) will be described. Each impression $Z_i$ is associated with one or more color conditions, and weights are defined for the color conditions. Note that the weights of one or more color conditions that are associated with the same impression $Z_i$ is summed up to 1. FIG. 18 shows an example of the impression $Z_1$ "natural", and the impression $Z_1$ "natural" is associated with three color conditions "green", "brown", and "beige". Furthermore, the weights 0.5, 0.25., 0.25 are respectively given to the three color conditions "green", "brown", and "beige". As shown in FIG. 18, for each of the color conditions, evaluation values for the values of density (intensity), chroma, and hue are defined. Here, in a case of a pixel of interest, by obtaining evaluation values for the values of density, chroma, and hue of the pixel and then multiplying these evaluation values by each other, the value of each color condition is calculated. Also, the value of the impression $Z_i$ of the pixel is calculated as a value obtained by giving the above-described weights to the values of the color conditions and multiplying these by each other.

In step S44, the calculation unit 43 calculates the value of each frame-overall impression $Z_i$ (i=1, 2, ..., I) of the comparative frame $F_j$. Note that "frame-overall" in this context refers to, if an area is designated on the area setting window W3, the entire area, whereas, if no designation was made, the entire frame screen. Specifically, the calculation unit 43 calculates, for each i (i=1, 2, ..., I), the value of the impression $Z_i$ for each pixel included in the entire comparative frame $F_j$, calculates an average of these values, and sets the average as the value of the frame-overall impression $Z_j$. Note that the value of the frame-overall impression $Z_i$ is a color index indicating a frame-overall color trend regarding the impression $Z_i$ (hereinafter, referred to as "impression index").

In subsequent step S45, the calculation unit 43 executes the same processing as step S44 on each of the reference frames $G_l$, $G_2$, ..., $G_L$ of the existing channel $CH_1$, $CH_2$, ..., $CH_L$. That is, the calculation unit 43 calculates, for each l (l=1, 2, ..., L), an impression index of the reference frame $G_l$ with respect to each of the impressions $Z_1$, $Z_2$, ..., $Z_I$. Note that, as shown in FIG. 13 and FIG. 17, step S45 is repeatedly executed, and thus, for the reference frame $G_l$ for which the impression index has been calculated, this value is referenced and new calculation processing is omitted.

In subsequent step S46, the calculation unit 43 calculates a frame-overall similarity degree $Bi_l$ between the comparative frame $F_j$ and each reference frame $G_l$ (l=1, 2, ..., L), based on the impressions $Z_1$, $Z_2$, ..., $Z_1$. Specifically, the calculation unit 43 calculates, for each l (l=1, 2, ..., L) and each i (i=1, 2, ..., I), the square value of the difference between the value of file frame-overall impression $Z_i$ of the comparative frame $F_j$ and the frame-overall impression $Z_i$ of the reference frame $G_l$. Then, for each l (l=1, 2, ..., L), the calculation unit 43 obtains a value by subtracting the square root of the sum of I square values (the distance between the comparative frame F, and the reference frame $G_l$ in the I-order impression space) from 1, and sets the resulting value as the similarity degree $Bi_l$.

Then, in step S47, the calculation unit 43 calculates, based on the already calculated similarity degrees $Bd_1$, $Bs_1$, $Bh_{11}$, $Bh_{21}$, and $Bi_l$ (l=1, 2, ..., L), a similarity degree $B_1$ between the comparative frame $F_j$ and each reference frame $G_l$ (l=1, 2, ..., L) (hereinafter, referred to as "total similarity degree"). Note that the total similarity degrees in the first and third embodiments are common in that they denote the similarity degrees in the entire frame, and thus the same reference sign B is used for denoting the festal similarity degrees. In the present embodiment, the calculation unit 43 calculates, for each l (l=1, 2, ..., L), a value (composition comparison result) that is obtained by subtracting the square root of the sum of $Bd_1$, $Bs_1$, $Bh_{11}$, $Bh_{21}$ (the distance between the comparative frame $F_j$ and the reference frame $G_l$ in the $4^{th}$-order space relating to four indexes) from 1, and then sets a value obtained by multiplying this value by $Bj_1$ (impression comparison result) as the total similarity degree $B_1$. Note that a different method may also be employed in other embodiments, and a value may be obtained, for example, by multiplying a suitable coefficient by the composition comparison result and/or the impression comparison result, or adding or subtracting a suitable value to or from the composition comparison result and/or the impression comparison result, and then multiplying the results by each other. Alternatively, a value obtained by summing up the square root of $1-Bd_1$, the square root of $1-Bs_1$, the square root of $1-Bh_{11}$, the square root of $1-Bh_{21}$, and $Bi_l$ while giving a suitable coefficient thereto may be set as the total similarity degree $B_1$.

With step S47 above, the total similarity degrees $B_1$, $B_2$, ..., $B_L$ are calculated. The flow of processing thereafter is the same as in the first embodiment.

<4. Usage>

The image processing program 2 can handle image processing with respect to various types of moving images, and can be used also in a scene where, for example, an organization such as the police analyzes surveillance images from security cameras in order to investigate an incidents For example, there may the a case where many security cameras are placed in the same shop, and these surveillance images are often recorded in the format of a mixed time-lapse moving image. In such a case, dedicated equipment in the shop in which the security cameras are placed can be used to separate channels included in the mixed time-lapse moving image, but in a police facility, which does not always possess the dedicated equipment that supports devices of manufacturers, reproduction is difficult. Accordingly, the above-described time-line separation processing in which a mixed time-lapse moving image can be separated into moving images of channels regardless of the specifications of a moving image can be used in such a scene.

<5. Modifications>

Although the embodiments of the present invention have been described so far, the present invention is not limited to the foregoing embodiments and various modifications are possible without departing from the spirit of the invention. For example, the following modifications are possible.

<5-1>

The re-sorting window W4 of the foregoing embodiments may be constituted by a plurality of windows.

<5-2>

In the foregoing embodiments, by switching the selected channel, the display of a frame group in the frame list area C2 can be switched on a channel or sort basis. However, a frame list area for displaying a frame group in a list may be provided for each of multiple channels and the sort "non-sorted". In this case, in order to efficiently use a screen space, thumbnail display for the frame group is preferably performed in the frame list area, and also a thumbnail image group is preferably sequenced along the time-line. Furthermore, in this case, the channel objects 91 and the non-sorted object 92 that have an icon format can be omitted, and the frame list area for each channel can be used as a channel object for the association operation, and the frame list area for the sort "non-sorted" can be used as a non-sorted object for the association operation. That is, a configuration is also possible in which an arbitrary frame is selected from the "non-sorted" frame list area, and is dragged and dropped to an arbitrary channel frame list area (channel object), so as to be able to be sorted to the channel corresponding to the area. The same applies to the case where a frame included in a channel is moved to another channel or sort.

Alternatively, a frame list area for displaying the "non-sorted" frame group in a list and a frame list area for displaying the frame group belonging to a channel in a list may be provided, so that the "non-sorted" frame group is constantly displayed in the former area. In this case, in the latter area, only the frame group belonging to the currently selected channel can be displayed in a list

<5-3>

In the third embodiment, various color indexes are defined, and are combined in various manner so as to define the total similarity degree $B_1$, but it is also possible to define the color indexes with another method, or combine the color indexes with another method to define the total similarity degree $B_1$. For example, in the third embodiment a composition is decided based on the color index regarding density, but the composition may be decided based on the color index regarding hue and/or chroma. Furthermore, the similarity degree $Bs_1$ is calculated based on the relative chroma between the sub-regions $R_1$ and $R_2$, but a difference in absolute chroma between the sub-regions $R_1$ and $R'_1$, or a difference in absolute chroma between the sub-regions $R_2$ and $R'_2$ may be set as the similarity degree $Bs_1$. Furthermore, a difference in density between the sub-regions $R_1$ and $R'_1$, or a difference in density between the sub-regions $R_2$ and $R'_2$ may be calculated as a similarity degree, and may be added to the total similarity degree $B_1$.

<5-4>

The foregoing embodiments have a configuration in which the area setting window W3 is displayed immediately after the channel separation processing has started, so that area setting for preventing erroneous determination is possible. However, it is also possible that this area setting window W3 is not displayed so that such area setting is impossible. Alternatively, a configuration is also possible in which, although the area setting window W3 is not displayed immediately after the channel separation processing has started, the re-sorting window W4 has a button for giving a command to restart the automatic sorting processing after the area setting has been performed. In this case, only when a result of the automatic sorting processing that was performed without performing area setting (the result includes a lot of erroneous determinations) is inappropriate, a user presses this button and displays the area setting window W3. Then, area setting is performed, and then the automatic sorting processing can again be executed. Alternatively, a configuration is also possible in which the area setting window W3 is displayed immediately after the channel separation processing has started, so that area setting is performed, and the automatic sorting processing can be executed in this state, and furthermore, the above-described button is also provided on the re-sorting window W4.

<5-5>

In step S9 of the foregoing embodiments, the combination of the comparative frame $F_i$ and the existing reference frame $G_{MAX}$ using weighted averaging is set as a new reference frame $G_{MAX}$. However, the method for updating the reference frame $G_{MAX}$ is not limited to this. For example, for each pixel, a histogram of pixel values of all frames (also including the comparative frame $F_j$ at this point in time) included in the channel $CH_{MAX}$ may be created, and the mode pixel value may be set as the pixel value of this pixel of the reference frame $G_{MAX}$. Alternatively, the pixel value serving as the central value of the histogram may be set as the pixel value of this pixel of the reference frame $G_{MAX}$.

<5-6>

In the foregoing embodiments, a configuration can be employed in which immediately after step S10 or the like ends, it is determined whether or not a channel count L has reached a predetermined number, and if it is determined that the channel count L has reached the predetermined number, processing for correcting an existing channel as with in step S11 is performed. This is because, if the channel count L increases too much, the processing load becomes very large. Note that it is preferable to employ a configuration such that, if there is a channel whose frame count is one, and a temporal distance from this one frame to the currently selected comparative frame $F_j$ is within a predetermined range, the channel is not deleted. This is because this channel is a recently created channel, and a frame to be sorted to this channel is likely to appear in the future. Note that, if even only performing the above-described channel deletion results in the channel count L exceeding the predetermined value, it is also possible to sequentially set the channels whose count is 2 or more, 3 or more or the like as targets of deletion, and to keep the channel count equal to or smaller than the predetermined number.

REFERENCE SIGNS LIST

1 Image processing device
2 Image processing program
41 Automatic sorting unit
42 Setting unit
43 Calculation unit
44 Determination unit
45 Re-sorting unit
91 Channel objects
92 Non-sorted object
C3 Play area
W4 Re-sorting window (re-sorting screen)

The invention claimed is:

1. An image processing device for sorting frames included in one moving image into different channels, the frames included in the moving image being a mixture of frames belonging to the different channels, comprising
   an automatic sorting unit of a computer configured to calculate a similarity degree of the plurality of frames included in the moving image by performing image processing on the frames, and sort the plurality of frames into the plurality of channels based on the similarity degree, wherein the automatic sorting unit includes;
   a setting unit of the computer configured to set a specific frame included in the moving image or a frame that is obtained by combining two or more specific frames included in the moving image as a reference frame, and set another specific frame included in the moving image as a comparative frame;
   a calculation unit of the computer configured to execute calculation processing of dividing the comparative frame and the reference frame into a plurality of sub-regions, calculating a local similarity degree between the comparative frame and the reference frame for each sub-region, and calculating a total similarity degree, which is a frame-overall similarity degree, between the comparative frame and the reference frame only using pixel values of sub-regions having a high local similarity degree; and
   a determination unit of the computer configured to execute determination processing of determining, based on the total similarity degree, whether or not the comparative frame belongs to the same channel as that of the reference frame or the frames combined into the reference frame, and
   each of the sub-regions includes a plurality of pixels.

2. An image processing device for sorting frames included in one moving image into different channels, the frames included in the moving image being a mixture of frames belonging to the different channels, comprising
   an automatic sorting unit of a computer configured to calculate a similarity degree of the plurality of frames included in the moving image by performing image processing on the frames, and sort the plurality of frames into the plurality of channels based on the similarity degree,
   wherein the automatic sorting unit includes:
   a setting unit of the computer configured to set a specific frame included in the moving image or a frame that is obtained by combining two or more specific frames included in the moving image as a reference frame, and set another specific frame included in the moving image as a comparative frame;
   a calculation unit of the computer configured to perform calculation processing of detecting feature points from the comparative frame, setting a vicinity region for each feature point, and calculating a total similarity degree, which is a frame-overall similarity degree, between the comparative frame and the reference frame only using pixel values of the vicinity regions; and
   a determination unit of the computer configured to execute determination processing of determining, based on the total similarity degree, whether or not the comparative frame belongs to the same channel as that of the reference frame or the frames combined into the reference frame, and
   each of the vicinity regions includes a plurality of pixels.

3. The image processing device according to claim 2, wherein the calculation unit is configured to divide the comparative frame into a plurality of sub-regions, and detect the feature points for each sub-region from the comparative frame.

4. The image processing device according to claim 2, wherein the calculation unit is configured to calculate, for each vicinity region, a local similarity degree between the comparative frame and the reference frame, and calculate the total similarity degree only using vicinity regions having a high local similarity degree.

5. The image processing device according to claim 1, wherein the setting unit is configured to accept, from a user, setting of an area in a frame screen, set an image in the area of the specific frame included in the moving image or a frame that is obtained by combining images in the area of the two or more specific frames included in the moving image, as the reference frame, and set an image in the area of the other specific frame included in the moving image as the comparative frame.

6. The image processing device according to claim 1, wherein the setting unit is capable of setting a plurality of reference frames, and the calculation unit is configured to execute, if the plurality of reference frames are set, the calculation processing on each of the reference frames, and the determination unit is configured to determine, in the determination processing, that the comparative frame and the reference frame or the frames combined into the reference frame that have the highest total similarity degree belong to the same channel.

7. The image processing device according to claim 6, wherein the setting unit is configured to sequentially select frames from the moving image, and set the first selected frame as the reference frame and a frame selected thereafter as the comparative frame, each time the setting unit is configured to newly set a comparative frame, the calculation unit is configured to execute the calculation processing and the determination unit is configured to execute the determination processing, and if it is determined, in the determination processing, that the comparative frame does not belong to the same channel as any of the reference frames or any of the frames combined into the reference frames, the setting unit again is configured to set that comparative frame as the reference frame.

8. The image processing device according to claim 6, wherein the setting unit is configured to sequentially select frames from the moving image, and set the first selected frame as the reference frame and a frame selected thereafter as the comparative frame, each time the setting unit newly is configured to set a comparative frame, the calculation unit is configured to execute the calculation processing and the determination unit is configured to execute the determination processing, and if it is determined, in the determination processing, that the comparative frame belongs to the same channel as any of the reference frames or any of the frames combined into the reference frames, the setting unit is configured to combine that comparative frame with the reference frame.

9. The image processing device according to claim 7, wherein, if the plurality of reference frames are set, after the final frame has been selected from the moving image and the calculation processing and the determination processing have ended, the calculation unit is configured to calculate a similarity degree between the plurality of reference frames, and the determination unit is configured to combine channels that correspond to reference frames that have a high similarity degree between the plurality of reference frames into one channel.

10. The image processing device according to claim 7, wherein, after the final frame has been selected from the moving image and the calculation processing and the determination processing have ended, the determination unit is configured to delete the channel to which only a predetermined number or less of frames belong.

11. The image processing device according to any claim 1, wherein the similarity degree is a correlation coefficient.

12. A non-transitory computer readable medium storage an image processing program for sorting frames included in one moving image into different channels, the frames included in the moving image being a mixture of frames belonging to the different channels, the image processing program causing a computer to execute a sorting step of calculating a similarity degree of the plurality of frames included in the moving image by performing image processing on the frames, and sorting the plurality of frames into the plurality of channels based on the similarity degree, wherein the sorting step includes steps of:

setting a specific frame included in the moving image or a frame that is obtained by combining two or more specific frames included in the moving image as a reference frame;

setting another specific frame included in the moving image as a comparative frame;

dividing the comparative frame and the reference frame into a plurality of sub-regions;

calculating a local similarity degree between the comparative frame and the reference frame for each sub-region;

calculating a total similarity degree, which is a frame-overall similarity degree, between the comparative frame and the reference frame only using pixel values of sub-regions having a high local similarity degree; and executing determination processing of determining, based on the total similarity degree, whether or not the comparative frame belongs to the same channel as that of the reference frame or the frames combined into the reference frame, and each of the sub-regions includes a plurality of pixels.

13. A non-transitory computer readable medium storing an image processing program for sorting frames included in one moving image into different channels, the frames included in the moving image being a mixture of frames belonging to the different channels, the image processing program causing a computer to execute a sorting step of calculating a similarity degree of the plurality of frames included in the moving image by performing image processing on the frames, and sorting the plurality of frames into the plurality of channels based on the similarity degree, wherein the sorting step includes the steps of:

setting a specific frame included in the moving image or a frame that is obtained by combining two or more specific frames included in the moving image as a reference frame;

setting another specific frame included in the moving image as a comparative frame;

detecting feature points from the comparative frame;

setting a vicinity region for each feature point;

calculating a total similarity degree, which is a frame-overall similarity degree, between the comparative frame and the reference frame only using pixel values of the vicinity regions; and determining, based on the total similarity degree, whether or not the comparative frame belongs to the same channel as that of the reference frame or the frames combined into the reference frame, and each of the sub-regions includes a plurality of pixels.

14. The image processing device according to claim 3, wherein the calculation unit is configured to calculate, for each vicinity region, a local similarity degree between the comparative frame and the reference frame, and calculate the total similarity degree only using vicinity regions having a high local similarity degree.

15. The image processing device according to claim 2, wherein the setting unit is configured to accept, from a user, setting of an area in a frame screen, set an image in the area of the specific frame included in the moving image or a frame that is obtained by combining images in the area of the two or more specific frames included in the moving image, as the reference frame, and set an image in the area of the other specific frame included in the moving image as the comparative frame.

16. The image processing device according to claim 3, wherein the setting unit is configured to accept, from a user, setting of an area in a frame screen, set an image in the area of the specific frame included in the moving image or a frame that is obtained by combining images in the area of the two or more specific frames included in the moving image, as the reference frame, and set an image in the area of the other specific frame included in the moving image as the comparative frame.

17. The image processing device according to claim 4, wherein the setting unit is configured to accept, from a user, setting of an area in a frame screen, set an image in the area of the specific frame included in the moving image or a frame that is obtained by combining images in the area of the two or more specific frames included in the moving image, as the reference frame, and set an image in the area of the other specific frame included in the moving image as the comparative frame.

* * * * *